US012670051B2

(12) United States Patent
Riemer et al.

(10) Patent No.: US 12,670,051 B2
(45) Date of Patent: Jun. 30, 2026

(54) ADAPTIVE ANOMALY DETECTION IN TIME-SERIES DATA

(71) Applicant: Innovative Electronic Technologies, LLC., Metairie, LA (US)

(72) Inventors: Terry Edmund Riemer, New Orleans, LA (US); Lawrence James Tedesco, Jr., New Orleans, LA (US)

(73) Assignee: Innovation Electronic Technologies, LLC, Metairie, LA (US)

( * ) Notice: Subject to any disclaimer, the term of this patent is extended or adjusted under 35 U.S.C. 154(b) by 0 days.

(21) Appl. No.: 18/940,608

(22) Filed: Nov. 7, 2024

(65) Prior Publication Data

US 2025/0147830 A1      May 8, 2025

Related U.S. Application Data

(60) Provisional application No. 63/596,814, filed on Nov. 7, 2023.

(51) Int. Cl.
| | |
|---|---|
| *G06F 11/00* | (2006.01) |
| *G06F 11/07* | (2006.01) |
| *G06F 11/30* | (2006.01) |
| *G06F 11/34* | (2006.01) |

(52) U.S. Cl.
CPC ...... *G06F 11/0751* (2013.01); *G06F 11/0754* (2013.01); *G06F 11/3058* (2013.01); *G06F 11/3452* (2013.01); *G06F 11/3065* (2013.01); *G06F 11/3089* (2013.01)

(58) Field of Classification Search
CPC ............ G06F 11/0751; G06F 11/0754; G06F 11/3058; G06F 11/3065; G06F 11/3089; G06F 11/3452
See application file for complete search history.

(56) References Cited

U.S. PATENT DOCUMENTS

| | | | |
|---|---|---|---|
| 9,710,727 B2 * | 7/2017 | Bala ........................ | G06V 20/52 |
| 11,625,032 B2 * | 4/2023 | Basak ................ | G05B 23/0283 |
| | | | 702/183 |
| 2008/0077355 A1 * | 3/2008 | Casler .................... | G06Q 10/10 |
| | | | 702/179 |
| 2012/0089357 A1 * | 4/2012 | Lakshminarayan .. | G06F 17/141 |
| | | | 702/179 |

(Continued)

*Primary Examiner* — Elmira Mehrmanesh
(74) *Attorney, Agent, or Firm* — Marin Patents LLC; Gustavo Marin

(57) ABSTRACT

An anomaly detection system may receive uniformly spaced digital data from a plurality of sensors connected to the monitored system and physical model parameters specific to components of the monitored system. An orthogonal function processor generates an initial set of orthogonal kernel basis functions to process the digital data to detect signature anomalies. An adaptive analysis is performed based on the number of feature components and the width of each feature component. When the number of feature components is greater than the basis functions, additional basis functions are used for reprocessing. When the feature width is less than the basis function, the resolution of the basis function is increased and reprocessing of digital data is performed. Based on the adaptive analysis of each feature component, signature anomalies are identified and displayed.

13 Claims, 13 Drawing Sheets

(56)     References Cited

U.S. PATENT DOCUMENTS

| 2013/0318011 A1* | 11/2013 | Jones ................. | G05B 23/0243 |
| | | | 706/12 |
| 2015/0142384 A1* | 5/2015 | Chao ................... | G06F 11/3089 |
| | | | 702/182 |
| 2015/0269050 A1* | 9/2015 | Filimonov ......... | G06Q 10/0639 |
| | | | 702/183 |
| 2017/0102696 A1* | 4/2017 | Bell ................... | G05B 23/0275 |
| 2017/0309094 A1* | 10/2017 | Farahat ............... | G07C 5/0841 |
| 2024/0333631 A1* | 10/2024 | Zafer ..................... | H04L 45/70 |

* cited by examiner

600

Raw sensor data 602

Digital conversion 604

Data cleanup 606

Sample rate detection 608

Resampling 610

B

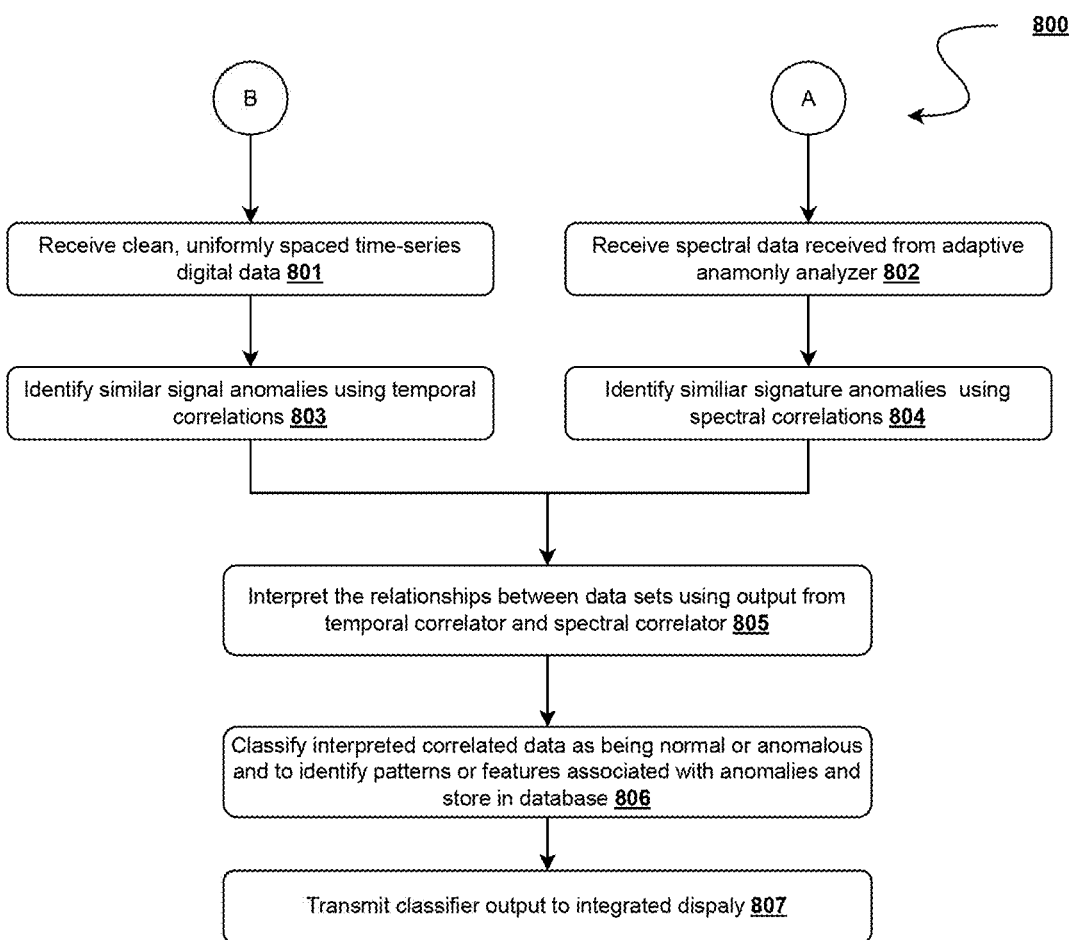

_800_

B

A

Receive clean, uniformly spaced time-series digital data 801

Receive spectral data received from adaptive anamonly analyzer 802

Identify similar signal anomalies using temporal correlations 803

Identify similiar signature anomalies using spectral correlations 804

Interpret the relationships between data sets using output from temporal correlator and spectral correlator 805

Classify interpreted correlated data as being normal or anomalous and to identify patterns or features associated with anomalies and store in database 806

Transmit classifier output to integrated dispaly 807

Fig. 8

Equipment Monitoring Dashboard

1000

Critical Alerts: 1    Warning Alerts: 1    Maintenance Alerts: 1    Systems Normal: 12

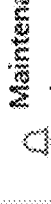

Critical Alerts    1013

Pump Bearing A-123 - High Frequency Vibration
Location: Building 3 - Line 2
Timestamp: 2024-11-06 14:23:45
Criticality: Critical

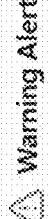

Warning Alerts    1012

Flow Valve F-789 - Flow Rate Deviation
Flow rate trending below normal operating range
Timestamp: 2024-11-06 13:15:22

Current Sensor Readings    1004

Temperature
85.2°C

Pressure
2.4 MPa

Vibration
12.3 mm/s

Flow Rate
450 L/min

Maintenance Alerts    1010

Motor M-456 - Scheduled Maintenance
Forecast: Bearing replacement required within 30 days
Wear Rate: 0.15mm/month

Fig. 10B

ADAPTIVE ANOMALY DETECTION IN TIME-SERIES DATA

CROSS-REFERENCE TO RELATED APPLICATIONS

This application claims priority to U.S. Provisional Application No. 63/596,814, filed Nov. 7, 2023, the specification of which is hereby incorporated by reference in its entirety.

BACKGROUND OF THE INVENTION

Field of the Art

The disclosure relates to the field of time-series analysis and performance monitoring, and more particularly to anomaly detection in time-series data from monitored systems such as rotating machinery, flow equipment, process equipment, and industrial systems.

Discussion of the State of the Art

In industrial and manufacturing environments, early detection of equipment anomalies is crucial for preventing failures, optimizing maintenance schedules, and ensuring operational efficiency. Time-series analysis is widely used in monitoring various parameters including vibration, pressure, flow rates, temperature, and electrical characteristics across different types of equipment. When monitoring such environments, quick identification of anomalies is crucial for preventing catastrophic failures and minimizing operational losses.

Current time-series-based anomaly detection systems face significant challenges related to data collection and storage including, but not limited to, handling non-stationary data, processing both steady-state and transitory signals, managing irregular sampling intervals, and dealing with data quality issues and artifacts. The presence of extremely aliased time-series data and data compression artifacts from database storage adds additional complexity to the detection process.

Further, most existing classical signal processing-based solutions rely heavily on statistical training data rather than incorporating an understanding of the actual physical system being monitored. Existing systems do not consider normal operating parameters of different types of equipment's at different operating conditions. This leads to difficulties in correlating detected anomalies with actual physical problems in the equipment and a limited understanding of system behavior under normal operating conditions.

Hence, there is a need for an anomaly detection system that can provide accurate, real-time analysis while efficiently managing computational resources and effectively correlating detected anomalies with physical equipment problems.

SUMMARY OF THE INVENTION

Accordingly, the inventor has conceived and reduced to practice, in a preferred embodiment of the invention an anomaly detection system including: a processor, a memory, and a plurality of programming instructions, the plurality of programming instructions when executed by the processor cause the processor to: receive uniformly spaced digital data from a plurality of sensors connected to a monitored system; receive physical model parameters specific to the monitored system; an orthogonal function processor configured to generate an initial set of orthogonal kernel basis functions based on the physical model parameters, wherein the uniformly spaced digital data from the monitored system is processed by the initial set of orthogonal kernel basis functions to detect signature anomalies; and an adaptive anomaly analyzer configured to: for each feature component in each of detected signature anomalies, determine a number of feature components; responsive to a number of basis functions being less than a number of feature components, trigger generation of additional basis functions, wherein the uniformly spaced digital data is reprocessed using the initial set of orthogonal kernel basis functions and the additional basis functions; responsive to the number of basis functions being greater than the number of feature components, compare width of the feature component with the width of the initial set of orthogonal kernel basis functions; responsive to the feature component width being less than a width of the initial set of orthogonal kernel basis functions, trigger generation of modified basis functions, wherein the modified basis functions are higher resolution than initial set of orthogonal kernel basis functions, and wherein the uniformly spaced digital data is reprocessed using the modified basis functions; responsive to completion of analysis of each feature component, transmit identified signature anomaly and associated volume of energy spectrum to damage detectors; transmit identified signature anomaly and associated volume of energy spectrum to damage alert generators; and responsive identified signature anomaly exceeding an equipment-specific threshold for sudden equipment problem, generate and display an instantaneous alert, wherein the instantaneous alert includes component-specific problem location, problem type, criticality level, and timestamp.

In some aspects, the techniques described herein relate to an anomaly detection system, wherein the plurality of programming instructions, when executed by the processor cause the processor to: receive, by a data manager, raw sensor data from the plurality of sensors coupled to the monitored system; convert, by the data manager, the raw sensor data to digital data, and perform data cleanup on the digital data; detect, by a sample rate detector a sample rate of the digital data after the data cleanup; estimate the data compression factor (by estimating the minimum required sampling rate based on the Nyquist theorem or using entropy-based compression methods) of data stored in database; and resample, by a resampler, cleaned digital data to generate the uniformly spaced digital data.

In some aspects, the techniques described herein relate to an anomaly detection system, wherein the plurality of programming instructions, when executed by the processor cause the processor to: generate a three-dimensional energy map; analyze energy patterns in three-dimensional energy map; determine whether energy distribution is uniform, responsive to a non-uniform energy distribution, detect energy discontinuities; map detected energy discontinuity characteristics as the signature anomalies; and extract feature components from the signature anomalies.

In some aspects, the techniques described herein relate to an anomaly detection system, wherein the plurality of programming instructions, when executed by the processor cause the processor to: responsive to identification of approaching threshold conditions, developing anomaly patterns, maintenance notifications, performance degradation warnings and efficiency loss indicators, generate and display an accumulated damage alert, wherein accumulated damage alert includes wear rates, early warning indicators, part replacement forecast, maintenance notifications In some aspects, the techniques described herein relate to an anomaly detection system, wherein the plurality of programming instructions, when executed by the processor cause the processor to: compress high-level noise in the processed digital data; expand low-level signals in the processed digital data; and display the identified signature anomaly.

In some aspects, the techniques described herein relate to an anomaly detection system, wherein the orthogonal kernel basis functions include a series of gaussian distribution shape functions defined by a width, a height, and offset parameters multiplied by a complex exponential summed together to form a digital filter In some aspects, the techniques described herein relate to an anomaly detection system, wherein the physical model parameters include equipment-specific characteristics including at least one of: rotational speeds, balance parameters, alignment specifications, flow rates, pressure ranges, temperature ranges, electrical characteristics, and equipment process specifications.

In some aspects, the techniques described herein relate to an anomaly detection system, wherein the monitored system includes at least one of: rotating equipment including pumps, compressors, generators, turbines, or motors; flow equipment including valves, pipelines, or fittings; electrical equipment including transformers, switchgear or uninterruptable power supply (UPS); or process equipment including heat exchangers, separators or extraction units.

In some aspects, the techniques described herein relate to an anomaly detection system, wherein the plurality of sensors includes at least: voltage meters for measuring electrical potential differences; ammeters for measuring current flow; phase meters for measuring electrical phase relationships; flow rate meters for measuring fluid flow; piezoelectric transducers for measuring mechanical stress; accelerometers for measuring vibration; temperature sensors for measuring thermal conditions; optical sensors for measuring position; or capacitive sensors for measuring process parameters.

In some aspects, the techniques described herein relate to an anomaly detection system, wherein the display includes a dashboard for the monitored system, wherein the dashboard includes alerts, warnings related to specific components in monitored system, notifications related maintenance, sensor readings and health reports.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

FIG. 8 is a flow diagram describing a method of anomaly detection, according to another embodiment of the invention.

FIG. 10B shows an equipment monitoring dashboard depicting anomalous operation in the centrifugal pump system, according to an embodiment of the invention.

DETAILED DESCRIPTION

Figure 1:
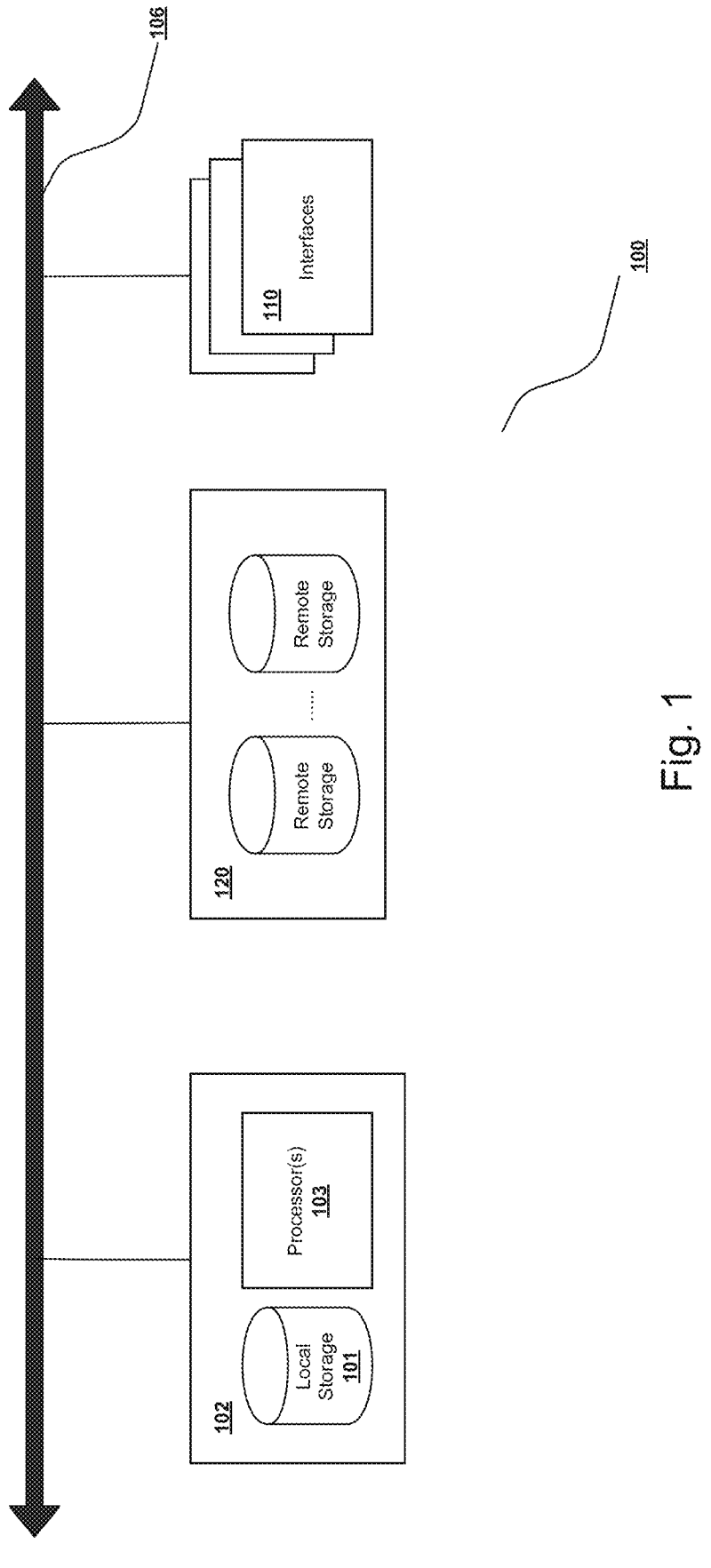
FIG. 1 is a block diagram illustrating an exemplary hardware architecture of a computing device used in an embodiment of the invention.

The inventor has conceived, and reduced to practice, an advanced anomaly detection system designed for monitoring and analyzing time-series data from monitored systems such as rotating machinery, flow equipment, process equipment, and industrial systems. At its core, the system utilizes a unique approach based on orthogonal kernel basis functions to analyze the energy distribution patterns in time-series data. Unlike traditional methods, this system adapts its analysis resolution and processing parameters based on the characteristics of detected anomalies, ensuring optimal detection accuracy while maintaining computational efficiency. The system first processes clean, uniformly spaced digital data through orthogonal kernel basis functions to generate a three-dimensional energy map, where deviations from uniform energy distribution indicate potential equipment issues. When energy discontinuities are detected, the system analyzes their characteristics through feature component separation and detailed mapping, correlating these patterns with specific physical problems in the monitored system. The system's adaptive nature allows it to automatically adjust its resolution and analysis parameters based on the width and complexity of detected feature components, ensuring precise anomaly characterization while minimizing false positives. By directly correlating energy distribution patterns with physical equipment issues, the system provides early detection of developing problems, enabling predictive maintenance, and preventing catastrophic failures. This methodology is particularly effective for analyzing both steady-state and transient conditions, handling data, nonstationary data, compression artifacts, and processing highly aliased time-series data without compromising accuracy.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the inventions(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

"Component physical model" refers to the physical model of the individual sensor or component part of the monitored system.

"Composite physical model" refers to the physical model of all the components that make up the monitored system.

"Energy map" refers to a three-dimensional representation of energy distribution across phase, frequency, and amplitude domains in the monitored system.

"Feature component" refers to an individual characteristic element of a signature anomaly, composed of different shapes of volumes in the energy map space.

"Signature anomaly" refers to a visualization or pattern in the energy distribution space that represents a deviation from normal system operation, correlating to specific physical problems in monitored system.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize several types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as, for example an end-user computer system, a client computer, a network server or other server system, a mobile computing device (e.g., tablet computing device, mobile phone, smartphone, laptop, or another appropriate computing device), a consumer electronic device, a music player, or any other suitable electronic device, router, switch, or another suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, several types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
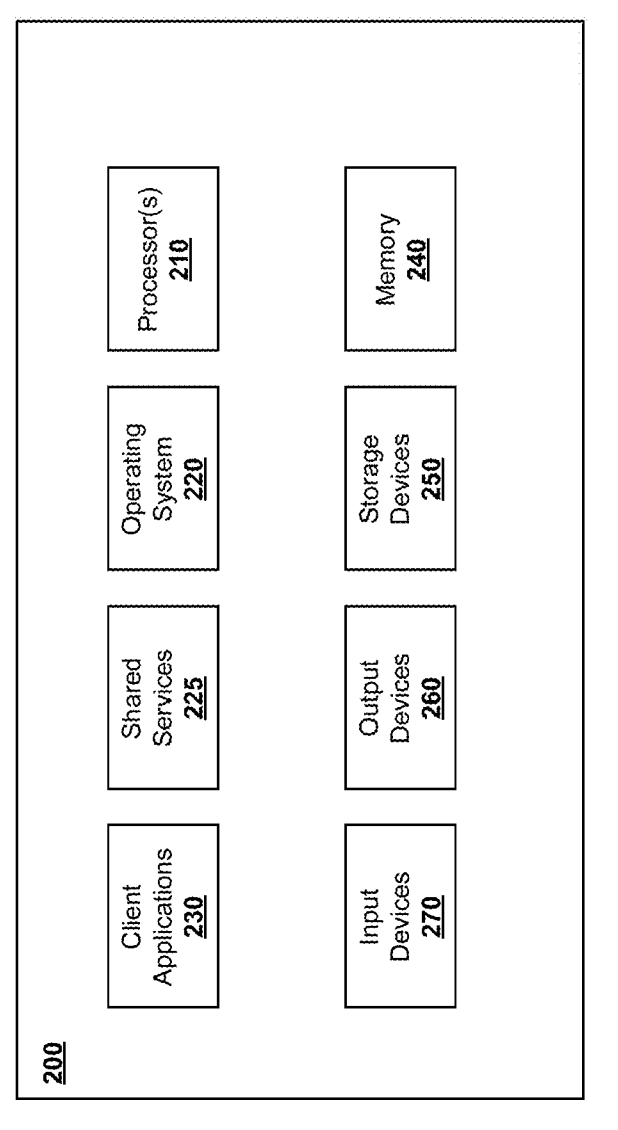
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that conduct one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
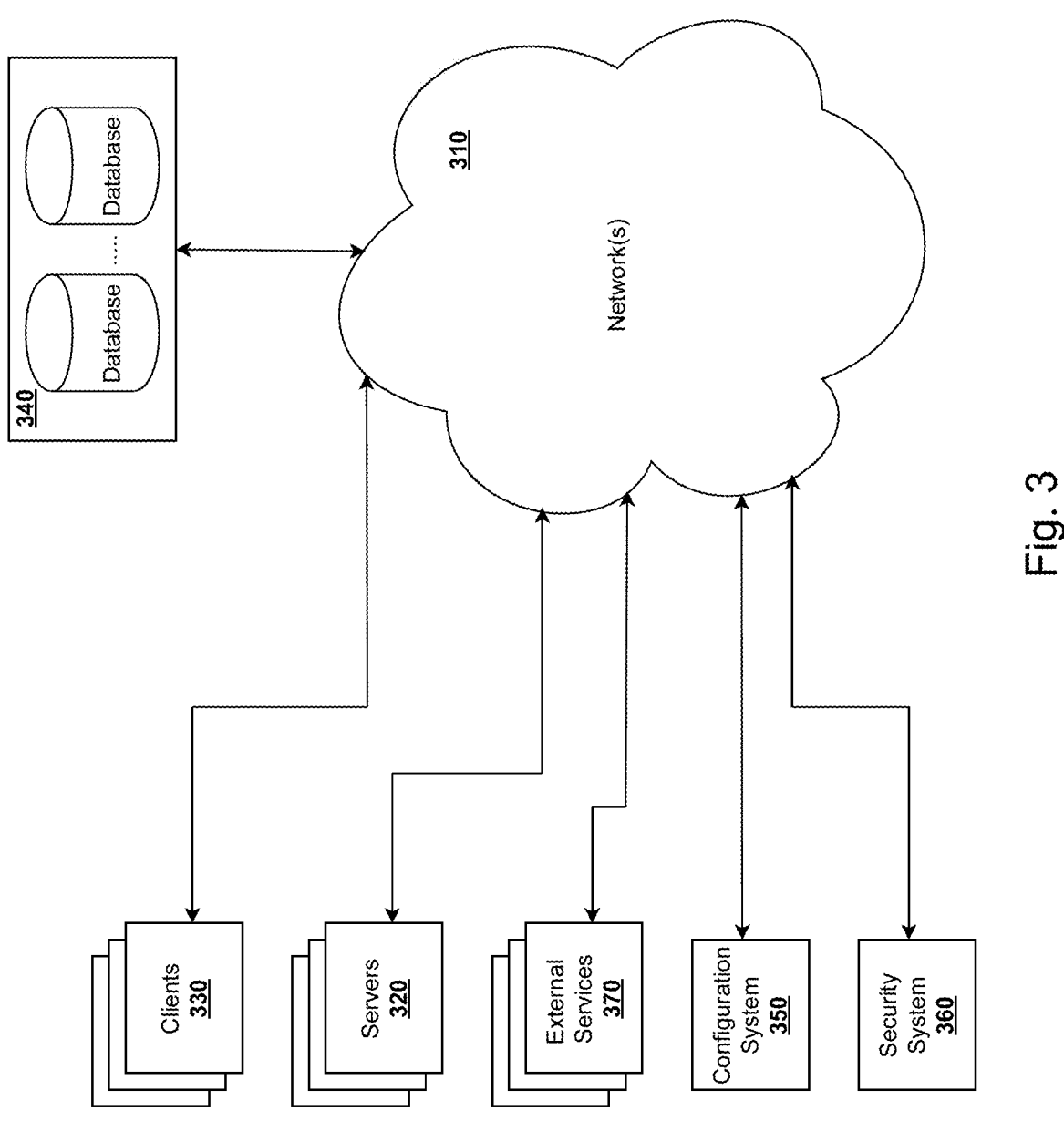
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprises or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google Bigtable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
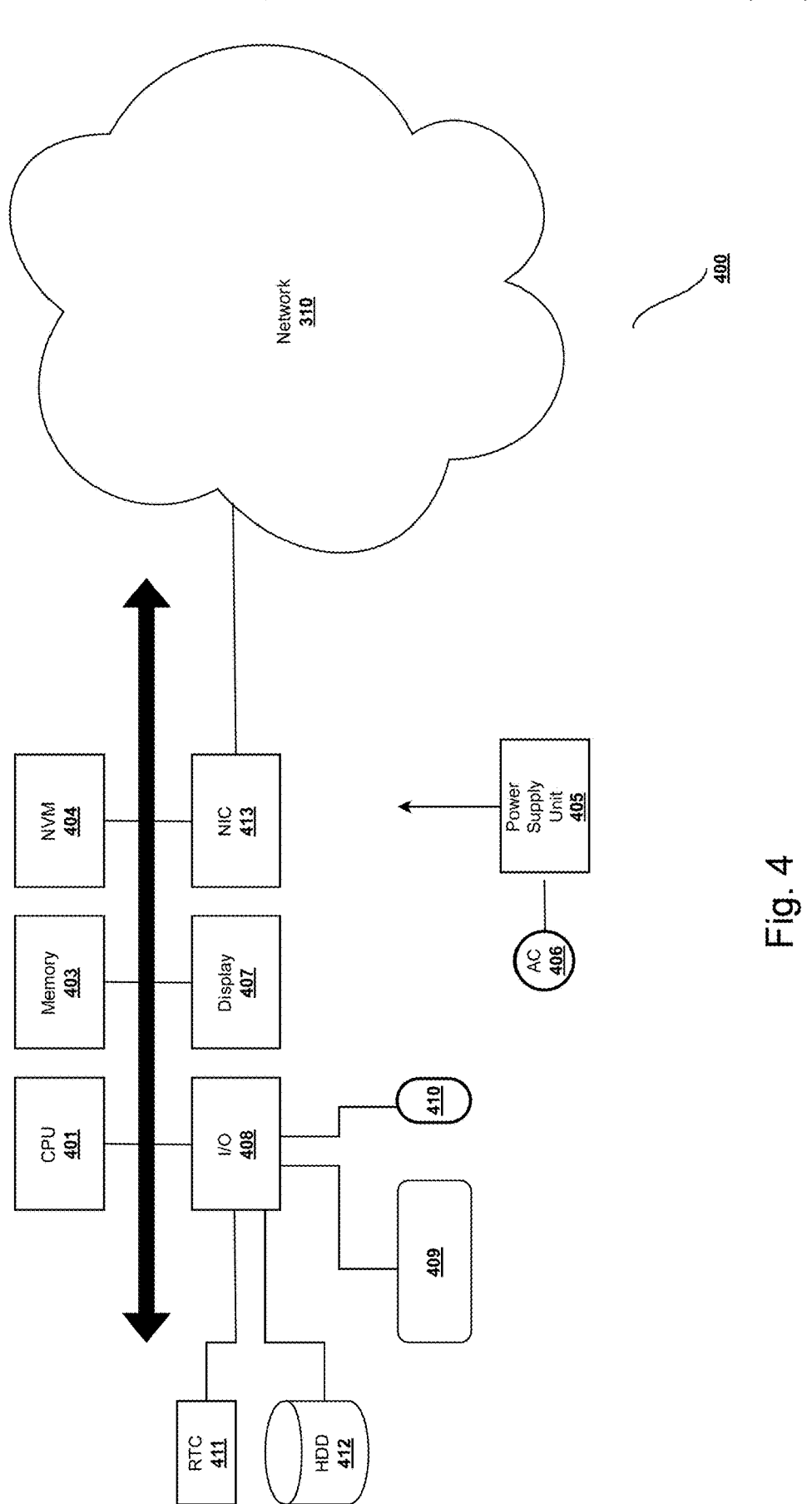
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 310, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

Figure 5:
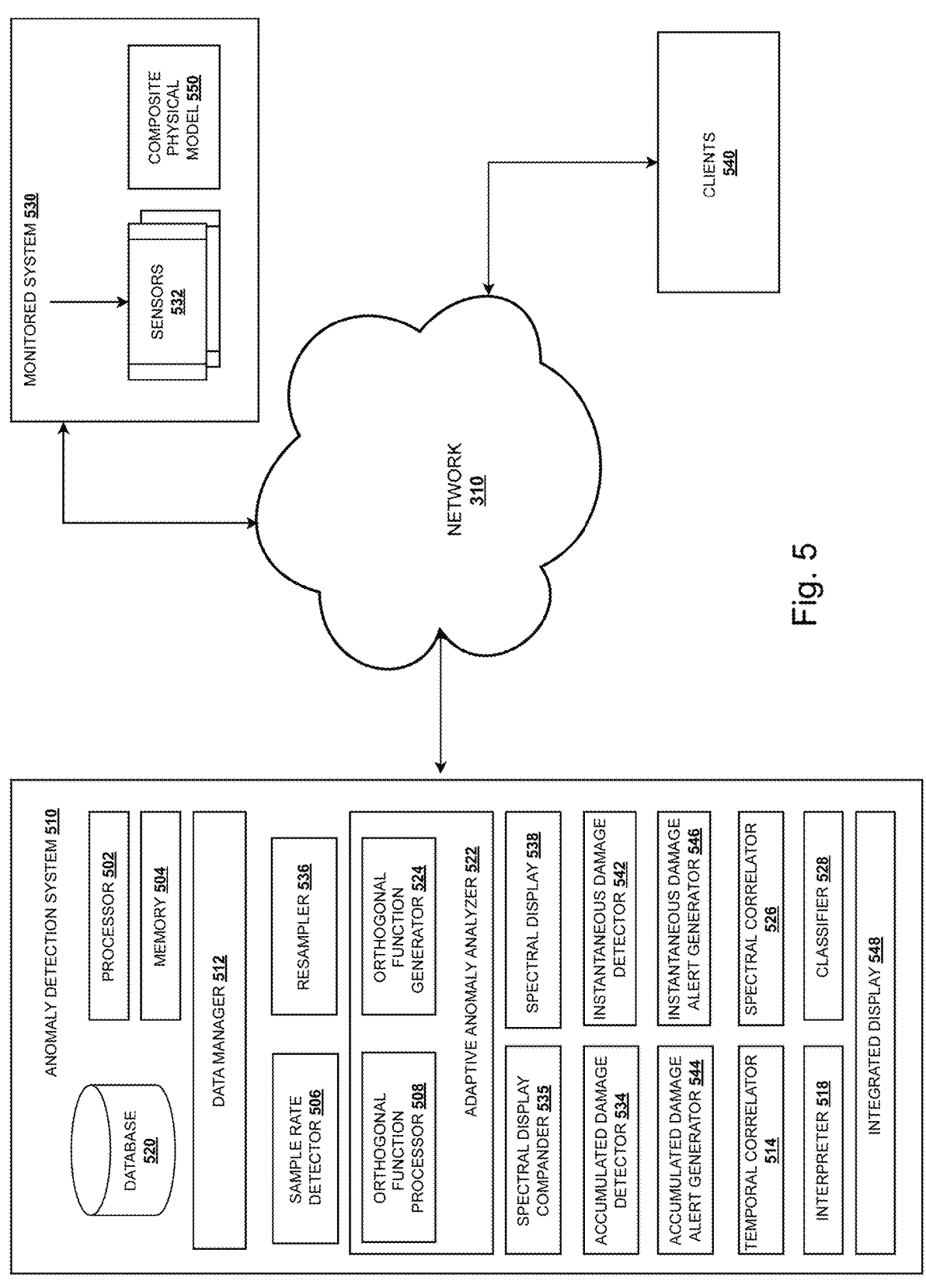
FIG. 5 is a block diagram illustrating an anomaly detection system used in a monitoring environment, according to an embodiment of the invention.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.
Conceptual Architecture FIG. 5 is a block diagram illustrating an anomaly detection system 510 used in a monitoring environment, according to an embodiment of the invention. User devices/clients 540 may use anomaly detection system 510 to monitor performance, equipment health, operating efficiency, maintenance needs, early detection of protentional issues, and identification of physical problems in monitored system 530. Monitored system 530 may include, but are not limited to, at least a portion of: separators, engines, motors, power plants, pumps (centrifugal pumps, electrical submersible pumps, pipeline pumps, positive displacement pumps, slurry and embolism pumps, water pumps, waterflood pumps), well systems, steam lines, draught fans, valves, generators, compressor, pipeline systems, turbines, filtration systems, flow systems, general system, combination systems or any other system with rotating and reciprocating components. In an example, anomaly detection system 510 may be used for identifying faults during manufacturing, production, and exploration. In another example, anomaly detection may be used for identifying leaks and damages in valves, flowlines, and pipelines.

According to an embodiment, anomaly detection system 510 comprises processor 502, memory 504, and a plurality of programming instructions, the plurality of programming instructions stored in memory 504 that when executed by processor 502 cause the processor to receive data from the plurality of sensors of monitored system 530, process the received time-series data, identify anomalies in received sensor data and generate alerts.

In an embodiment, anomaly detection system 510 further comprises data manager 512, sample rate detector 506, resampler 536, adaptive anomaly analyzer 522, spectral display compander 535, spectral display 538, accumulated damage detector 534, accumulated damage alert generator 544, instantaneous damage detector 542, instantaneous damage alert generator 546, database 520, temporal correlator 514, spectral correlator 526, interpreter 518, and classifier 528. The adaptive anomaly analysis for received time-series data is performed by adaptive anomaly analyzer 522 using orthogonal function processor 508 and orthogonal function generator 524.

In an embodiment, anomaly detection system 510 may be, for example, a computing platform that hosts an application such as an anomaly detection program to detect anomalies in received time-series data. Anomaly detection system 510 may implement a combination of devices and technologies, such as network devices and corresponding device drivers, to support the operation of anomaly detection system 510, and to provide a platform enabling communications between monitored system 530 and tools used by anomaly detection system 510.

In an embodiment, monitored system 530 may include a multitude of sensors 532 that are part of a data collection system and a composite physical model 550. These sensors 532 may generate time-series periodic or almost periodic time-series analog raw data. Each sensor has a component physical model which when combined with all component physical models form composite physical model 550 for that set. Individual models represent expected behavior for each measurement point. Each sensor 532 is monitored and its unique component physical model would be correlated into a composite physical model 550 to create a comprehensive representation of the entire system behavior for the entire monitored system 530. In an embodiment, physical model parameters represent the characteristics and expected behavior of individual equipment components under normal operating conditions. The physical model parameters are specific to each type of equipment components in monitored system 530 and form the building blocks of the composite physical model 550.

In an embodiment, anomaly detection system 510 may use physical model parameters as system input based on the individual sensor components of that model and these individual components together comprise an overall physical model for the component system. Each component's physical model may be different for each component in the system.

In an embodiment, time-series data received from monitored system 530 may be analyzed by anomaly detection system 510 to detect anomalous, unusual, or unexpected data points in a data set. A data point recorded at a point in time in a time-series data set may represent a value or observation of a variable, parameter, item, or event as recorded at the point in time in the time-series data set. Where data points represent system or process variables or parameters, an anomalous data point may serve as an indication of a corresponding issue that may be present in monitored system 530. In normal operation, the time-series data set may not have any time discontinuities, and in case of issues, discontinuities may be present in the time-series data set received from monitored system 530. Examples of time-series data received may be associated with process parameters such as vibration, pressure, flow rate, acceleration, motor speed, motor output power, motor current, and temperature. In some cases, physical properties like mass, volume, level, density, and concentration may be received from sensors and monitored to detect deviations from normal operating conditions. Further in some cases, chemical properties comprising heat of combustion, enthalpy of formation, acidity, and basicity can be tracked as time-series data to monitor chemical process health and safety.

Examples of sensors 532 providing time-series data may include but are not limited to acoustic sensors, voltage meters, ammeters, phase meters, flow rate meters, piezo-electric transducers, accelerometers, temperature sensors, optical sensors, and capacitive sensors. The use of sensors and the composite physical model 550 enables anomaly detection system 510 to provide comprehensive equipment monitoring and accurate problem detection while minimizing false alarms and providing clear direction for maintenance activities.

In an embodiment anomaly detection system 510, may receive time-series analog signals from the output of each of the multitude of sensors 532 and these analog signals may be converted to the digital domain. The converted time-series data set in the digital domain may be stored in database 520. Anomaly detection system 510 may be configured to receive steady state and/or transient signals and is designed to process non-stationary data. In an embodiment, data manager 512 may be configured to receive time-series analog data from the multitude of sensors 532 using data acquisition systems. Further, data manager 512 may include Analog-to-digital converters (ADC) to convert the received time-series analog data to digital format.

In an embodiment, the time-series data in digital format is stored in database 520. In an embodiment, every time new observed values are obtained from monitored system 530, they are converted by data manager 512, and the newly observed values are added to the end of the already-stored time-series data stored in database 520.

In an embodiment, data manager 512 may be configured to clean up the stored data to obtain clean digital data from the output of database 520. Data manager 512 may clean the digital data stored in database 520 by removing duplicate artifacts, and invalid points in the time-series data. Further, data manager 512 may also be configured to arrange data sets as per time, perform data type conversions, and store data quality metrics (e.g. including but not limited to computing signal-to-noise ratio of the sample values and flagging duplicate sample values and associated timestamps, I/O issues, and bad values).

In an embodiment, correlation might be used to relate how two different random signals or processes are related to each other. The probability density function (PDF) of a continuous Random Variable (RV) X is defined as $$f(x) = f_X(x) = \frac{dF(x)}{dx}$$

is a density function indicating where the RV values are more (or less) consolidated. The joint PDF of two or more RVs is a probabilistic relationship jointly describing the distribution of multiple random variables in the parameter space.

The correlation between two signals is an extremely important concept, which measures the degree of similarity (alignment) between the two signals. The correlation function provides a quantitative measure to the degree of similarity. The autocorrelation (ACF) function is defined as $$R_x(t_1, t_2) = E[X(t_1)X(t_2)]$$

The cross-correlation function (CCF) of two random processes X(t) and Y(t) is defined as the average cross correlation of the two processes:

$$R_{xy}(t + \tau, t) = E[X(t + \tau)Y(t)]$$

In an embodiment, sample rate detector 506 may be used by anomaly detection system 510 to estimate native sample interval using mathematical techniques including, but not limited to, empirical probability/histogram density function, autocorrelation function, cross-correlation function, moving window mean, expected value, and variance. Sample rate detector 506 may also estimate the data compression factor (by estimating the minimum required sampling rate based on the Nyquist theorem or using entropy-based compression methods) of data stored in database 520. Optimal data compression factor estimation ensures that the resampling process doesn't introduce artificial precision or lose important information from the original data. In an embodiment, resampler 536 may be configured to convert clean irregularly spaced time-series digital data stored in database 520 into uniformly spaced clean digital data using estimated native sample interval. This regular spacing is crucial for many of the subsequent analysis techniques used in the anomaly detection process.

In a perfectly designed data collection system, a resulting 3-D energy map of periodically sampled data would have no discontinuities. However, in the real world, physical devices are not balanced systems and contain time and energy map discontinuities.

To identify the signature anomalies spectral analysis is performed. Spectral analysis involves examining the frequency components and energy distribution of signals over time. When analyzing time-series data like vibration, pressure, or current measurements, spectral analysis breaks down these complex signals into their constituent frequency components. This decomposition reveals how much energy exists at each frequency, helping to identify patterns that indicate normal operation versus anomalous behavior. In a properly functioning system, these frequency components will maintain consistent patterns. However, when equipment develops problems like bearing wear, misalignment, or imbalance, new frequency components appear, or existing ones change in amplitude. By tracking these spectral changes over time, developing problems can be detected before they lead to failure.

Consider monitoring an electric motor driving a pump. The motor current signature may show specific frequency components during normal operation based on electrical line frequency, rotor characteristics, and mechanical load. If a bearing starts degrading, new frequency components appear in the current signature due to the varying mechanical load caused by the damaged bearing. This change in the spectral content serves as an early warning of developing problems. The spectral analysis effectively transforms complex time-series measurements into actionable diagnostic information about equipment health.

The spectral analysis disclosed in the document uses Fourier analysis including:

Forward Fourier Transform:

$$G(2\pi f) = \int_{-\infty}^{\infty} g(t) e^{-j2\pi ft} dt$$

Where: g(t) is the time function, $G(2\pi f)$ represents the frequency spectrum, and f denotes frequency in the analog domain Digital Frequency Response of Forward Fourier Transform:

$$G(nW_s) = \sum_{n=0}^{a_n} a_n e^{-jnW_s}$$

where $W_s$ is the sample rate, n represents frequency domain steps, and $a_n$ represents the weight.

The weight, $a_n$, and the phase, $e^{-jnW_s}$, make up a set of single kernel basis functions or basis signals for every value of n. To satisfy the Nyquist sampling theorem, it is required that $W_s > 2w$. If this theorem is not satisfied, the effects of aliasing are introduced into the data collection system which generates artifacts into the monitored sensor data.

The Fourier series is a natural result of discretizing the Forward Fourier Transform. The orthogonality of the basis functions is a result of the phase component represented by the complex exponential, $e^{-jnW_s}$. Orthogonal kernel basis functions are chosen because there is no overlap in the signal space, and they minimize the computational resources required to identify a signature anomaly. Orthogonal kernel basis functions are mathematical functions that span the signal space, providing phase, amplitude, and frequency information about signature anomalies. The terms "orthogonal kernel basis functions," "basis functions," and "orthogonal basis functions" are used interchangeably throughout this document and refer to the use of orthogonal kernel basis functions for processing and reprocessing of the clean uniformly spaced digital data to detect anomalies in the received time-series data.

In an embodiment, orthogonal function processor 508 may generate an initial set of orthogonal kernel basis functions that span the signal space by using the physical model parameters as a system input. The physical model parameters represent the characteristics and expected behavior of individual equipment components of monitored system 530 under normal operating conditions. These parameters are specific to each type of monitored component and form the building blocks of the composite physical model 550. These parameters are specific to each type of monitored system 530 and form the building blocks of the composite physical model 550. In an example rotating equipment may have parameters related to speed, vibration, balance, and alignment; flow systems may have parameters for pressure, flow rates, and fluid mechanics; and electrical systems may have parameters for voltage, current, power, frequency, temperatures and phase relationships.

In an embodiment, orthogonal function processor 508 uses a series of Gaussian distributions as the shape factor for the weight, $a_n$, multiplied by the phase, $e^{-jnW_s}$, summed together as the initial orthogonal kernel basis functions to match the feature of the signal under investigation as closely as possible. For an initial estimate of the orthogonal kernel basis function, a series of Gaussian distributions are selected for the weight, $a_n$, to adjust the shape of the curve multiplied by the phase summed together to make it orthogonal. The Gaussian distribution is chosen because it enables you to adjust the width, the height, and the parameter offset of the distribution's curve very conveniently which is represented by the weight, $a_n$, in the following equation:

Initial Orthogonal Kernel Basis Function $$G(nW_s) = \sum_{n=0}^{a_n} \frac{A}{\sigma\sqrt{2\pi}} e^{-\frac{1}{2}\frac{(nW_s-\mu)^2}{\sigma}} e^{-jnW_s}$$

Where $\sigma$ is defined as the width of the bell curve of the Gaussian distribution, $\mu$ is defined as the parameter offset, and A is defined as the amplitude of the Gaussian distribution curve.

In an embodiment, orthogonal kernel basis functions may be used by adaptive anomaly analyzer 522 to identify certain frequency components in the time-series data. Based on the convolution of signal f(t) with orthogonal kernel basis functions g(t) an energy map providing complete coverage of the signal vector space and capturing three key characteristics-phase (including time of occurrence), amplitude, and frequency is created.

Convolution:

$$f(t)*g(t)=h(t)$$

where h(t) represents the transfer function.

Forward Fourier Transform of Convolution:

$$F[f(t)*g(t)]=F(w)\times G(w)$$

The properties of the Forward Fourier Transform make it easier to detect the presence of signals by being able to convert between the time domain and the frequency domain for analysis.

In an embodiment, orthogonal kernel basis functions provide phase (including time), amplitude, and frequency of occurrence of signature anomalies in the energy map of monitored system 530. An energy map from the time-series data represents energy distribution across frequency, phase, and amplitude.

If there are discontinuities in the energy map, then there will be a visualization of the energy distribution in the 3-D detection space. This visualization in the 3-D energy distribution space or map is referred to as a signature anomaly and is correlated to the physical problem or problems that produced the discontinuity. In a perfectly operating system, the energy profile should be uniform or contain no variations across all dimensions, representing stable operation with constant (flat) amplitude at the fundamental frequency. Actual energy distribution may be compared to expected (uniform) distribution to identify deviations. Anomaly detection system 510 may be configured to identify variations from the fundamental frequency component in the 3D energy space. The baseline for comparison is a flat (constant amplitude) energy distribution, and any deviation from this flat distribution constitutes a signature anomaly and the signature anomaly correlates to specific physical problems in components of monitored system 530.

This signature anomaly in reality is a composite of a multitude of physical models. This information provides critical details about the anomaly and could be used to characterize the mode of failure of the physical device being monitored.

In an embodiment, adaptive anomaly analyzer 522 may be used to determine feature components of each of the signature anomalies generated from the orthogonal function processor 508. Feature components of signature anomalies may be distinctive characteristics or elements that make up an anomalous pattern in signal data. These components typically include specific shapes, amplitudes, frequencies, phases, and temporal patterns that distinguish the anomaly from normal operation. Each feature component represents a different aspect of the underlying physical phenomenon causing the anomaly. For example, in vibration analysis, a bearing fault might show feature components like impulses at specific frequencies, modulation patterns, and harmonic relationships.

In an embodiment, individual feature components may be composed of different shapes of volume. Adaptive anomaly analyzer 522 examines the characteristics of detected signature anomalies, focusing on the width of the signature anomaly and the number of signature anomalies detected.

In an embodiment, adaptive anomaly analyzer 522 may determine the number of orthogonal kernel basis functions required to process each signature anomaly which contain different frequency, phase, and amplitude characteristics. Adaptive anomaly analyzer 522 may determine the number and spacing of the orthogonal kernel basis functions adaptively to select parameters that are optimal for each signature anomaly extraction. In an embodiment adaptive anomaly analyzer 522 may be configured to generate a unique set of orthogonal kernel basis functions for each component signature anomaly detected to optimize the signature extraction process. This optimizes the computational resources required to process time-series data by only using the least number of orthogonal kernel basis functions required to extract the individual signature anomaly. This reduces errors in the processing of time-series data (for example, false detection of anomalies) by the anomaly detection system 510 without compromising the accuracy of the anomaly detection process.

In an embodiment, basis function evaluation is performed by adaptive anomaly analyzer 522 to select parameters that are optimal for each signature anomaly extraction. Basis function evaluation may include determining if there are enough orthogonal kernel basis functions to accurately extract each significant signature anomaly and whether the width of the current orthogonal basis functions is narrower than the width of the signature anomaly.

In an embodiment, when the signature anomaly is narrower than the width of the orthogonal kernel basis functions (native sample interval), an orthogonal function generator 524 generates a new set of orthogonal kernel basis functions to increase the resolution which narrows the spacing between orthogonal kernel basis functions. Providing more resolution in the frequency domain of the signature anomaly may suppress the high amplitude closely spaced noise spikes and expand the low amplitude signal spikes which have larger spacing between them.

In an embodiment, when more feature components for each signature anomaly are detected than can be represented by the current number of orthogonal kernel basis functions, additional orthogonal kernel basis functions may be generated by the orthogonal function generator 524.

The basis function evaluation with the generation of additional basis functions and/or generation of modified orthogonal kernel basis functions is iterative and continues until the resolution is appropriate (i.e., feature component width>basis function width), sufficient basis functions represent all feature components for all detected anomalies, and any further increases in resolution or number would not improve the analysis. The adaptive approach ensures that the analysis is optimized for the specific characteristics of the signature anomalies being detected, providing accurate results while maintaining computational efficiency.

In an embodiment, anomaly detection system 510 includes an integrated display 548 that may provide a dashboard displaying alerts, notifications related to maintenance, sensor readings, and health reports. Alerts may include immediate alerts, warning alerts, and advisory alerts. In an embodiment, this dashboard may be presented on devices connected to client 540 using a monitoring application. In an embodiment, alerts may be transmitted to control room operators, maintenance supervisors and other key personnel.

Immediate alerts are generated when the system detects critical conditions that require urgent attention. These include situations where operational parameters exceed critical thresholds, sudden anomalies are detected in equipment behavior, safety-critical conditions arise, operational limits are exceeded, or emergency shutdown conditions are identified. Anomaly detection system 510 recognizes these as situations requiring immediate operator intervention to prevent potential equipment damage or safety incidents.

Warning alerts may identify developing issues that, while not requiring immediate action, need attention in the near term. These warnings are triggered when operational parameters approach but haven't yet exceeded thresholds when emerging anomaly patterns are detected in equipment component behavior, when scheduled maintenance deadlines are approaching, when performance metrics show gradual degradation, or when efficiency metrics indicate declining trends. These warnings enable proactive intervention before issues escalate to critical status.

Advisory alerts provide maintenance planning recommendations based on equipment performance trends, identify opportunities for operational optimization, suggest efficiency improvements based on performance analysis, recommend preventive actions to avoid potential future issues, and notify operators of gradual performance trends that may impact long-term equipment health. This level of alerting supports strategic decision-making and helps maintain optimal equipment performance over time.

In an embodiment, accumulated damage detector 534 may take the complex spectral information (frequency, amplitude, and phase) from detected signature anomalies and transform it into a single, one-dimensional parameter that represents the cumulative impact of anomalies on monitored system health. This dimensional reduction makes it significantly easier to track and evaluate the progression of equipment wear or damage over time. For example, multiple small anomalies that individually might not warrant immediate attention can be tracked to show their cumulative effect on equipment health. Further, accumulated damage detector 534 can evaluate the severity of the problem. The output of this module may be provided to the accumulated damage alert generator 544.

In an embodiment, accumulated damage alert generator 544 generates an alert including wear rates, early warning indicators, part replacement forecast, and maintenance notifications. In some embodiments, process variable deviations may also be part of the alert. For example, any detected overpressure or high temperature may be provided as an alert. This alert is displayed (step 732) on the dashboard of integrated display 548. In some cases, the dashboard may be available to other computing devices including client 540.

This combined approach of accumulated damage detector 534 and accumulated damage alert generator 544 simplifies complex data for easier interpretation, enables proactive maintenance before catastrophic failure, reduces the expertise needed for monitoring, and provides equipment-specific tracking that accounts for different tolerance levels across various types of machinery. The anomaly detection system 510 stores this information in the database 520 to enable historical trending and pattern analysis, helping to refine threshold values and improve predictive capabilities over time.

In an embodiment, instantaneous damage detector 542 works as a real-time monitoring system focusing on immediate, significant anomalies that could indicate sudden equipment problems or failures. Instantaneous damage detector 542 may be configured to analyze individual signature anomalies by calculating the volume of their energy spectrum, to provide a quantitative measure of the anomaly's severity at that specific moment. This volume calculation considers the total energy distribution of each anomaly, helping to distinguish between minor variations and potentially serious equipment issues. Unlike the accumulated damage detector 534 which tracks long-term degradation, instantaneous damage detector 542 focuses on immediate, potentially critical situations that require immediate attention. The output of instantaneous damage detector 542 may be provided to the instantaneous damage alert generator 546.

In an embodiment, instantaneous damage alert generator 546 compares these energy spectrum volume calculations against predefined thresholds specific to the component. When the volume calculations exceed predefined thresholds specific to the component an instantaneous damage alert generator 546 generates an immediate alert including component-specific problem location, problem type, criticality level, and timestamp. The immediate alert may be displayed on the dashboard of integrated display 548. In some cases, the dashboard may be available to other computing devices including client 540.

The use of instantaneous damage detector 542 and instantaneous damage alert generator 546 may automate the detection of significant signature anomalies and instantaneous damage by generating an alert when any of the energy spectrum volume calculations for individual significant signature anomalies detected reach a defined threshold for each type of equipment being monitored. This instantaneous damage detector 542 and instantaneous damage alert generator 546 enable immediate response to sudden equipment problems, help prevent catastrophic failures through early detection and provide equipment-specific monitoring that accounts for different tolerance levels and operational characteristics. For example, in a rotating machinery application, it could immediately detect and alert operators to a sudden bearing failure, allowing for immediate shutdown before more severe damage occurs.

In an embodiment, temporal correlator 514 may be configured to perform time-series correlations to identify relationships between signal anomalies from the data set being processed and possible signal anomalies from other data sets in database 520 to identify which signal anomalies are most correlated. Techniques used by temporal correlator 514 may include computing the autocorrelation, cross-correlation or correlation coefficient and picking the signal anomaly from the database with the maximum correlation. PCA can also be used to reduce the data dimensionality and denoise the time-series data which can then be compared with the principal components of signature anomalies stored in the database. The purpose of the temporal correlator 514 is to help find the signal anomalies that are closest to the source of the problem and to identify datasets that are correlated for processing in the interpreter 518 module.

In an embodiment (PCA) is a mathematical technique used in signal processing for dimensionality reduction and feature extraction. It transforms correlated variables into a set of uncorrelated variables called principal components through orthogonal linear transformation thus assisting in separation of significant patterns from noise.

PCA operates by calculating the eigenvectors and eigenvalues of the data covariance matrix. These eigenvectors define the directions of maximum variance in the data, while the eigen values determine the magnitude of this variance along each direction. The principal components are ordered by the amount of variance they explain, with the first component accounting for the largest variance. This mathematical approach provides an optimal linear transformation for signal representation in terms of minimum mean square error.

In an embodiment, PCA relies on statistical moments and correlation analysis. By examining the covariance structure of signals, it identifies patterns and relationships between different signal components. This allows for efficient signal compression and feature extraction while maintaining the essential characteristics of the original data.

In an embodiment, spectral correlator 526 may be configured to perform spectral correlations to identify relationships between signature anomalies from the data set being processed and possible signature anomalies from other data sets in the database 520 to identify which signature anomalies are most correlated. Techniques used by spectral correlator 526 may include computing the autocorrelation, cross-correlation, or correlation coefficient, and picking the signature anomaly from the database with the maximum correlation. PCA can also be used to reduce the data dimensionality and denoise the time-series data which can then be compared with the principal components of signature anomalies stored in the database. Cross-correlation measures the similarity between two spectral signatures as a function of frequency shift. Autocorrelation measures the correlation of a spectral signature with a shifted version of itself, useful for finding repeating patterns in the frequency domain. Correlation coefficient matrix provides a measure of the linear correlation between multiple spectral features.

The purpose of the spectral correlator 526 is to help find the signature anomalies that are closest to the source of the problem and to identify datasets that are correlated for processing in the interpreter 518 module.

In an embodiment, interpreter 518 may be configured to take the output of temporal correlator 514 and the output of spectral correlator 526 and identify the source of the anomaly by measuring the amplitude of most correlated signature anomalies. The signature anomaly with the largest amplitude would be expected to be closest to the source of the anomaly. The interpreter may also be configured to compare signature anomaly characteristics to known signature anomaly libraries of equipment failures of several types to identify what physical problem is causing the signature anomaly to appear in the energy map and the nature of the equipment problem.

In an embodiment, classifier 528 may take the output of interpreter 518 and classify interpreted correlated data as being normal or anomalous. The output of the interpreter 518 can include but is not limited to the list of potential signature anomalies, their causes or sources and possible actions to rectify the anomalies. We employ various signal processing-based classifiers including but not limited to Kullback-Leibler divergence, Likelihood ratio tests and graph signal processing to classify the potential anomalies as true or false positives. Classifier 528 makes use of the composite physical model of the system, the list of potential anomalies from interpreter 518, the anomaly signature and the time-series data. In one particular embodiment, the classifier may, for example, replace the true physical model of a pressure valve in a bigger fluid management system with that of a faulty one and then compare the observed time-series data with that from the physical model by computing the Kullback-Leibler divergence metric between them and then declare it as a true positive (that is an anomaly) if it exceeds a certain precomputed or runtime calculated threshold. Furthermore, classifier 528 may also compute an associated confidence in its prediction based on how much greater or smaller the computed metric is than the threshold (for example, Kullback-Leibler divergence).

Figure 6:
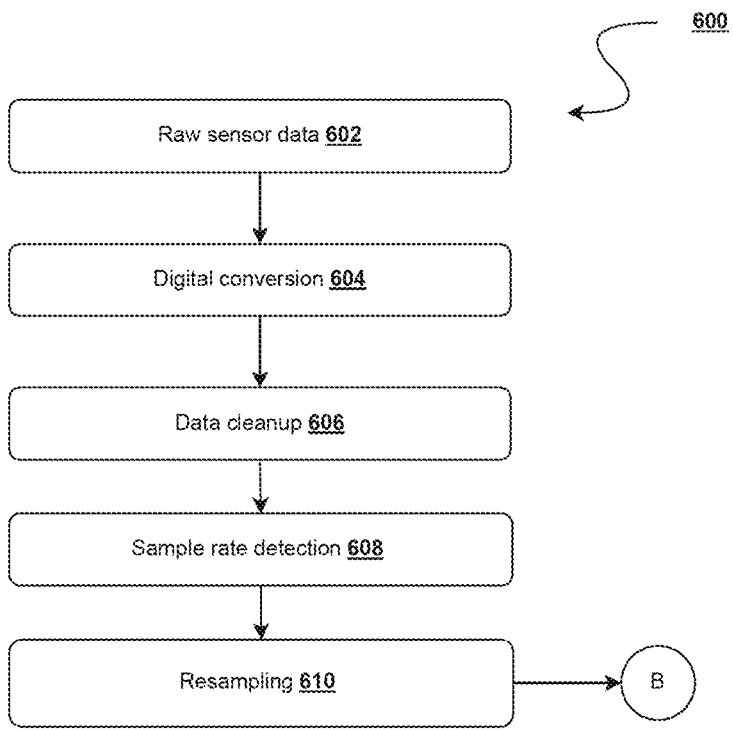
FIG. 6 is a flow diagram describing a method for preparing the time-series data for processing by the anomaly analyzer, according to an embodiment of the invention.

FIG. 6 is a flow diagram describing method 600 for preparing the time-series data for processing by the anomaly analyzer, according to an embodiment of the invention. At step 602, anomaly detection system 510 receives time-series data from sensors 532 connected to monitored system 530. Each sensor output may be time-series analog raw data which is received by the anomaly detection system 510. In an embodiment, data manager 512 may be configured to receive time-series analog data from the multitude of sensors 532 using data acquisition systems.

At step 604, anomaly detection system 510 may convert time-series data to the digital domain and store it in database 520. In an embodiment, data manager 512 may include Analog-to-digital converters (ADC) to convert the received time-series analog data to digital format.

At step 606, data manager 512 in anomaly detection system 510 may be configured to clean the stored data to obtain clean digital data from the output of database 520. Data manager 512 may perform the steps listed below to clean digital data stored in database 520. The initial processing steps performed may include data pull requests from database 520 defined by the start and end date, data type conversions for consistency, bad data identification and replacement with Not a Number (NaN), and data quality metric storage values for each sample. Data refinement steps may include the removal of duplicate sample time values and associated sample values, interpolation between the NaN values, and extrapolation to define the precise boundary start and end date data points for processing. Further, data range alignment may be performed to remove extra data points outside of the start date and end date of the data pull request from database 520.

In addition to data clean-up and refinements, quality assessment may be performed by data manager 512 to determine data compression, noise level, native sample interval, and signal continuity.

At step 608, anomaly detection system 510 may use a sample rate detector 506 to estimate the native sample interval and the data compression factor of the clean digital data returned from the data manager 512 by using mathematical techniques including, but not limited to probability density functions, autocorrelation function, cross-correlation function, moving window mean, expected value, and variance.

At step 610, resampler 536 may be configured to resample clean irregularly spaced time-series digital data in database 520 to generate uniformly spaced digital data using an estimated native sample interval and data compression factor.

Figure 7A:
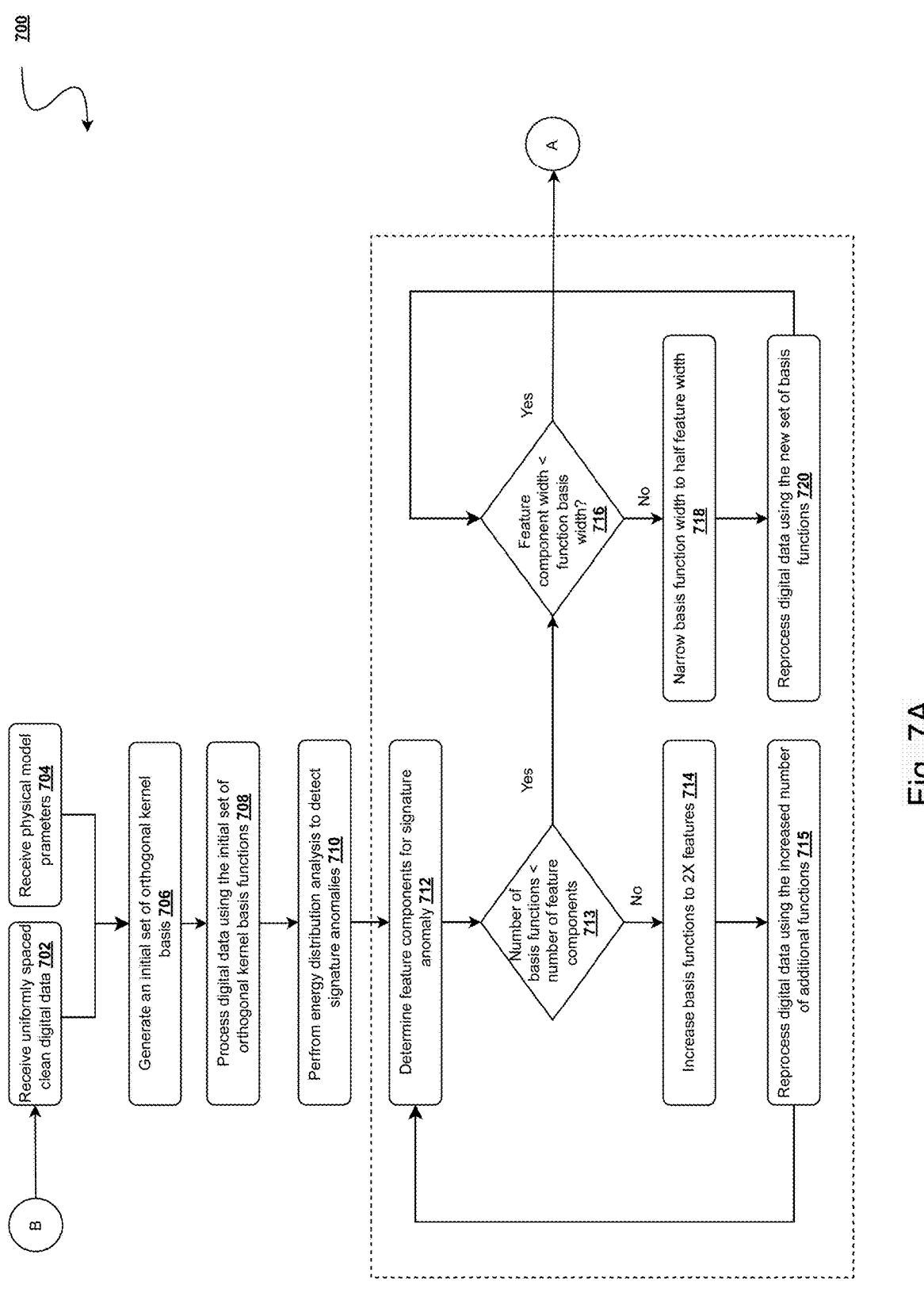
FIG. 7A is a flow diagram describing a method of anomaly detection, according to an embodiment of the invention.

FIG. 7A is a flow diagram describing method 700 of anomaly detection, according to an embodiment of the invention. The steps of method 700 are performed by anomaly detection system 510.

The process of anomaly detection is performed after data cleanup and resampling. The method of anomaly detection begins with receiving uniformly spaced clean digital data (step 702) and physical model parameters (step 704). The physical model parameters represent the characteristics and expected behavior of individual equipment components under normal operating conditions. The physical model parameters are specific to each type of equipment components in monitored system 530 and form the building blocks of the composite physical model 550.

At step 706, orthogonal function processor 508 may generate an initial set of orthogonal kernel basis functions that span the signal vector space by using the physical model parameters as system input.

The physical parameters provide orthogonal function processor 508 with information on how basis functions should be structured to effectively detect anomalies in that specific type of equipment or system. This ensures that anomaly detection is grounded in actual physical behavior rather than just statistical patterns. By using physical model parameters to generate the initial orthogonal kernel basis functions, a direct connection is maintained between anomaly detection system 510 and the real-world equipment behavior, improving the accuracy and reliability of anomaly detection while reducing false positives.

At step 708, uniformly spaced digital data is processed using the initial set of orthogonal kernel basis functions. When the clean, uniformly spaced digital data is processed using these basis functions, it decomposes the signal into its fundamental components based on the physical model parameters of components/equipment in monitored system 530. The orthogonal kernel basis functions provide a way to map the signal's energy distribution across different frequencies, phases, and amplitudes. This processing reveals any energy discontinuities or signature anomalies that deviate from the expected normal behavior defined by the physical model. The orthogonal basis functions act like a specialized filter set, where each function is designed to identify specific characteristics of potential anomalies while minimizing computational resources and reducing errors in anomaly detection.

At step 710, energy distribution analysis is performed with adaptive anomaly analyzer 522 to detect signature anomalies. The energy distribution analysis process reveals any energy discontinuities or signature anomalies that deviate from the expected normal behavior defined by the physical model. This identification provides a complete picture of the number and characteristics of anomalies present in the data set. Details of energy distribution analysis for signature anomaly detection and extraction of signature anomaly characteristics (feature components) are described in detail in FIG. 9.

In an embodiment, before the separation and analysis of feature components at step 712, all signature anomalies in the data are identified and counted based on results of comprehensive energy map analysis. An initial evaluation is performed to determine if the initial number of basis functions and the width of basis functions is sufficient to represent the detected signature anomalies. The initial set of orthogonal kernel basis functions may be decided based on the number of detected signature anomalies. This ensures sufficient basis functions to capture all significant signature anomalies At step 712, adaptive anomaly analyzer 522 may determine feature components for each signature anomaly. When a signature anomaly is detected in the energy map, it typically comprises multiple distinct feature components, each potentially indicating various aspects of an equipment issue. The initial processing generates the rough features of signature anomalies.

In an embodiment, a feature separation process begins by analyzing the energy discontinuity's volumetric structure in the three-dimensional space (time, frequency, and amplitude), identifying boundaries where energy distributions show distinct transitions or unique characteristics. The process employs the orthogonal basis functions to isolate individual features based on their unique energy distribution patterns. Each feature component is distinguished by examining its specific characteristics such as energy concentration, spatial distribution, and temporal/frequency relationships. The separation considers both the physical spacing between components in the energy map and their energy distribution patterns. For instance, a single signature anomaly might contain multiple feature components with different frequency bands, temporal occurrences, or amplitude levels, each representing distinct aspects of an equipment malfunction.

During separation, adaptive anomaly analyzer 522 analyzes the boundaries and interactions between feature components, ensuring accurate delineation while preserving the relationship information between components. This includes examining how components may overlap or interact in the energy space, their relative energy levels, and their temporal or frequency dependencies. Once separated, each feature component's characteristics are individually analyzed and cataloged, creating a detailed profile of the overall signature anomaly. This separation enables a more precise correlation between specific feature components and actual physical problems in the monitored system 530, improving the accuracy of problem identification and severity assessment.

The output of this processing stage (steps 708-712) provides signature anomalies with information about their phase, amplitude, spatial frequency, and time of occurrence in the energy map of the system under investigation, which is then analyzed further to determine if additional processing with higher resolution basis functions and increased number of basis functions is needed for more detailed examination of specific anomalies.

In an embodiment, adaptive anomaly analyzer 522 examines the characteristics of detected signature anomalies, focusing on the width of each feature component and the number of feature components detected.

At step 713, adaptive anomaly analyzer 522 determines whether the number of basis functions is less than the number of feature components.

When the number of basis functions is less than the number of feature components, adaptive anomaly analyzer 522, at step 714 increases basis functions to be twice the number of feature (Nyquist Theorem) components. At step 715, orthogonal function generator 524 generates additional basis functions, and reprocessing of digital data is performed using the increased additional basis functions. The generation of additional basis functions allows zoom-in on specific anomalies and their feature components and provides better details for areas of interest.

When the number of basis functions is greater than the number of feature components, method 700 proceeds to width analysis. At step 716, adaptive anomaly analyzer 522 determines whether the feature component width is less than the function basis width. The width of each feature component is precisely measured, as this parameter is crucial for determining whether the current set of orthogonal basis functions provides sufficient resolution for accurate analysis.

When the width of the feature components is less than the function basis width, adaptive anomaly analyzer 522, at step 718 narrows down the basis function component width to half the feature component width. At step 720, orthogonal function generator 524 generates a new set of basis functions with narrow width, and reprocessing of digital data is performed using the new set of basis functions. The number of orthogonal basis functions remains the same, and the width of the basis functions is changed to process the same digital data with a higher resolution.

Steps 712-720 are performed in an adaptive iterative manner by adaptive anomaly analyzer 522 until a sufficient number of basis functions ($\geq 2\times$ feature components) are used and appropriate resolution (basis function width$\leq \frac{1}{2}$ feature component width) is used for processing the digital data. The reprocessing at steps 715 and 720 is performed on the same clean uniformly spaced digital data. Steps 712-720 are performed for each feature component in the signature anomaly.

The adaptive process described above allows the system to adjust its analysis based on the actual data characteristics, even if the data has been compressed or aliased due to storage limitations.

By dynamically adjusting the number and resolution of basis functions, the system can focus computational resources where they are most needed for accurate anomaly detection while avoiding unnecessary processing of noise or artifacts introduced by data compression. This type of adaptive analysis of signature anomalies provides improved diagnostics with precise problem location identification, issue severity data, a clear indication of the problem, and early intervention.

The iterative approach by adaptive anomaly analyzer 522 maintains computation efficiency anomaly detection system 510 by increasing basis functions and resolution only when required and using the same cleaned data throughout iterations. Further, the resolution is fine enough to accurately detect anomalies without introducing false positives. Further, problems in monitored system 530 may detected early by confirming using multiple sensors and using the physical model parameters.

Figure 7B:
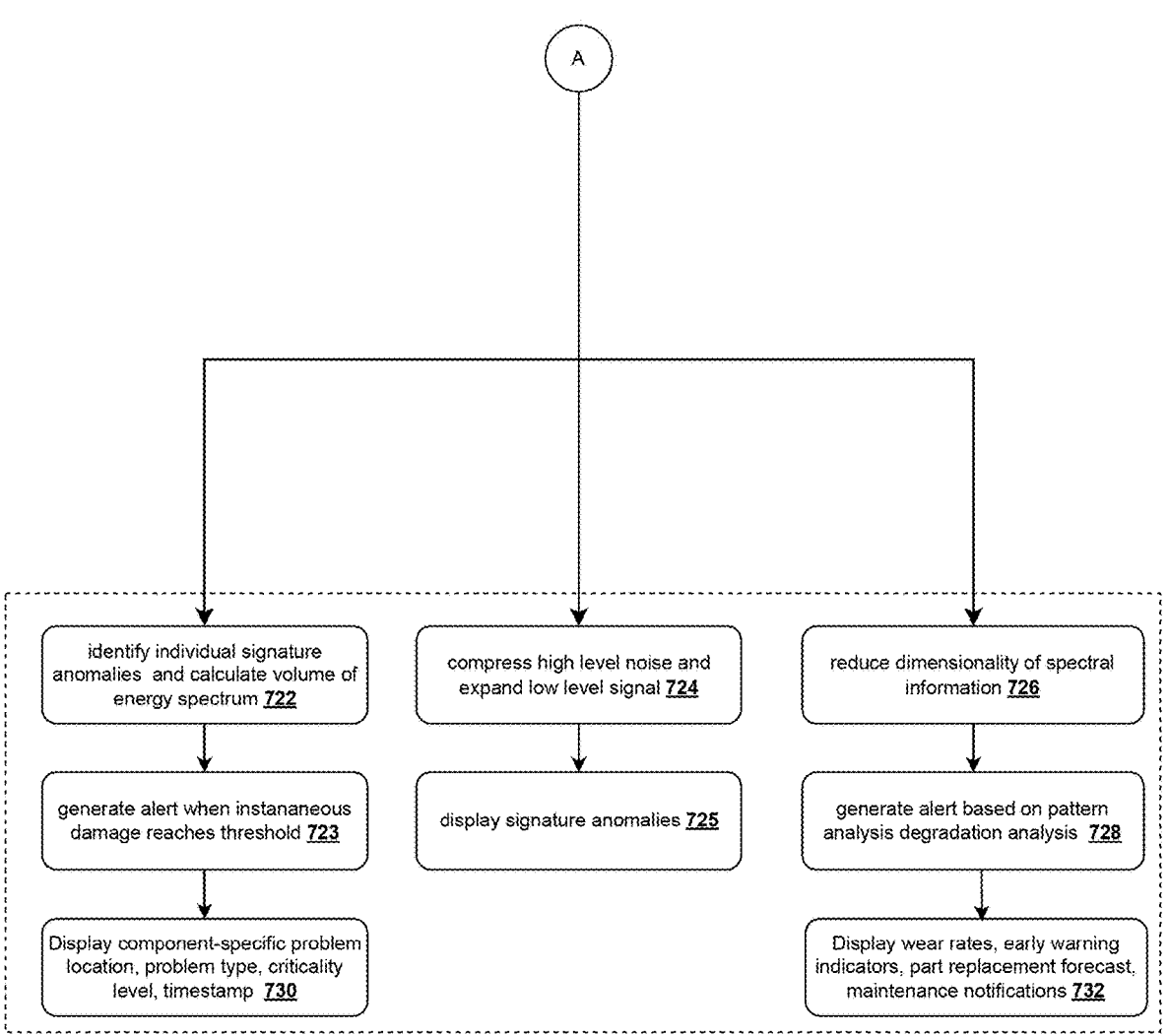
FIG. 7B is a flow diagram describing a method of anomaly detection continuing from FIG. 7A.

Once the conditions in steps 713 and 716 are met, different functions may be performed by anomaly detection system 510 as described in FIG. 7B.

FIG. 7B is a flow diagram continuing from FIG. 7A. At step 724, spectral display compander 535 may compress high-level noise and expand low-level signal. A compander is a signal processing device that performs both compression and expansion of signal dynamics. In this system, spectral display compander 535 is specifically designed to enhance the visibility of signature anomalies by manipulating the dynamic range of the spectral data display.

The compression component reduces the amplitude of high-level signals/noise using a non-linear scaling function. For example, if there are large amplitude spikes or noise that could mask smaller anomalies, these are compressed logarithmically to prevent them from dominating the display. This is similar to audio compression where loud sounds are attenuated more than quiet ones.

The expansion component amplifies low-level signals using another non-linear scaling function. This makes small amplitude anomalies more visible by stretching the lower portion of the amplitude range. The expansion process helps reveal subtle patterns or anomalies that might otherwise be hidden in the noise floor.

The dynamic range manipulation by spectral display compander 535 helps in identification of low-level signature anomalies in noise, visualization of multiple anomalies with varying amplitudes, and enhances low-level signal components without being overwhelmed by high-level components.

At step 725, spectral display 538 may display detected signature anomalies for analysis. Spectral display 538 may have the capability to isolate signature anomalies which is a form of feature extraction and measure fundamental statistical parameters for analysis. Spectral display 538 may have the capability to reprocess the data surrounding the isolated signature anomaly to provide greater resolution in the frequency domain which will isolate the physical problem of the equipment being monitored which is a form of an adaptive process.

At step 722, instantaneous damage detector 542 may assist in automating the detection of significant signature anomalies and instantaneous damage of the equipment being monitored by identifying the individual significant signature anomalies and calculating the volume of the energy spectrum of each identified signature anomaly.

The output of this module may be provided to the instantaneous damage alert generator 546. In an embodiment, instantaneous damage alert generator 546 compares these energy spectrum volume calculations against predefined thresholds specific to the component. When the volume calculations exceed predefined thresholds specific to the component, at step 723, an instantaneous damage alert generator 546 generates an immediate alert including component-specific problem location, problem type, criticality level, and timestamp. The immediate alert is displayed (step 730), on the dashboard of integrated display 548. In some cases, the dashboard may be available to other computing devices including client 540.

At step 726, accumulated damage detector 534 may assist in automating the detection of significant signature anomalies and subsequent accumulated damage of the equipment being monitored by reducing the dimensionality of the spectral information (frequency, amplitude, and phase) of the signature anomalies into a one-dimensional parameter making it easier to evaluate the severity of the problem. The one-dimensional parameter represents the cumulative impact of anomalies on equipment health. This dimensional reduction makes it significantly easier to track and evaluate the progression of equipment wear or damage over time. For example, multiple small anomalies that individually might not warrant immediate attention can be tracked to show their cumulative effect on equipment health.

At step 728, accumulated damage detector 534 tracks the cumulative effects of detected anomalies by tracking parameters and degradation analysis. Spectral analysis output and sensor readings may be used for identifying cumulative energy distribution changes, pattern frequency changes, and trend deviation measurements. Degradation analysis may be performed to compute wear rate calculations, remaining useful life estimation, risk level assessment, and performance impact quantification. The output of this module may be provided to the accumulated damage alert generator 544. In an embodiment, accumulated damage alert generator 544 may generate an alert including wear rates, early warning indicators, part replacement forecast, and maintenance notifications. The alert may be displayed (step 732) on the dashboard of integrated display 548. In some cases, the dashboard may be available to other computing devices including client 540.

The anomaly detection system may be used in industrial applications for its distinct monitoring and detection capabilities. In rotating equipment applications, such as large industrial water pumps in cooling systems, the system may utilize a combination of vibration accelerometers, pressure sensors, flow meters, and temperature sensors to detect emerging bearing faults. By identifying high-frequency vibration components characteristic of bearing wear, correlating these with pressure fluctuations, and detecting subtle temperature increases in the bearing housing, the system enables maintenance teams to schedule repairs before catastrophic failure occurs.

FIG. 8 is a flow diagram describing method 800 of anomaly detection, according to another embodiment of the invention. At step 801, temporal correlator 514 may receive clean uniformly spaced time-series digital data using data received and processed by adaptive anomaly analyzer 522. At step 803, temporal correlator 514 may use the clean uniformly spaced time-series digital data and may perform time-series correlations to identify similar signal anomalies between the current data set being processed and other data sets available in database 520. Temporal correlator 514 accesses other data sets stored in database 520 to perform comparisons and identify similar anomalies across different time periods or related systems. Techniques used by temporal correlator 514 may include autocorrelation function, cross-correlation function, correlation coefficient matrix, and principal component analysis. Temporal correlator 514 finds signal anomalies that are most closely correlated across different data sets, identifies signal anomalies that are closest to the source of the problem, and may identify datasets that are correlated for further processing by interpreter 518.

At step 802, spectral correlator 526 may receive spectral data including signature anomalies from adaptive anomaly analyzer 522. At step 804, spectral correlator 526 performs multivariate spectral correlations to identify similar signature anomalies between data sets in database 520 that are the most correlated and the signature anomaly with the strongest amplitude which would be closest to the source of the problem. Techniques used by spectral correlator 526 may include autocorrelation function, cross-correlation function, correlation coefficient matrix, and principal component analysis.

Spectral correlator's 526 ability to work in the frequency domain complements temporal correlator's 514 time-domain analysis. This dual approach allows anomaly detection system 510 to detect anomalies that may not be apparent in the time domain alone, such as subtle changes in frequency components that could indicate initial stages of equipment wear or malfunction.

The outputs from temporal correlator 514 and spectral correlator 526 may be provided to interpreter 518. At step

805, interpreter 518 may determine relationships between data sets using outputs from temporal correlator 514 and spectral correlator 526. Interpreter 518 may be configured to determine insights into the nature and cause of the signature anomalies detected. Interpreter 518 may analyze the patterns and characteristics of the signature anomalies, identify potential causes or sources of the anomalies, and provide recommendations or actions that can be taken to address the issues detected. Interpreter 518 is critical as it improves the accuracy and reliability of monitored system 530 by providing more detailed and actionable information about the signature anomalies detected. These techniques may involve manual interpretation of the data as well as automated techniques.

At step 806, classifier 528 may take the output of interpreter 518 and classify interpreted correlated data as being normal or anomalous based on a physical model of monitored system 530 under normal operating conditions. Classifier 528 may be configured to determine whether an observation or data point is normal or anomalous based on a physical model of monitored system 530 under normal operating conditions. At step 807, the output of classifier 528 may be sent to integrated display 548 and stored in database 520.

Figure 9:
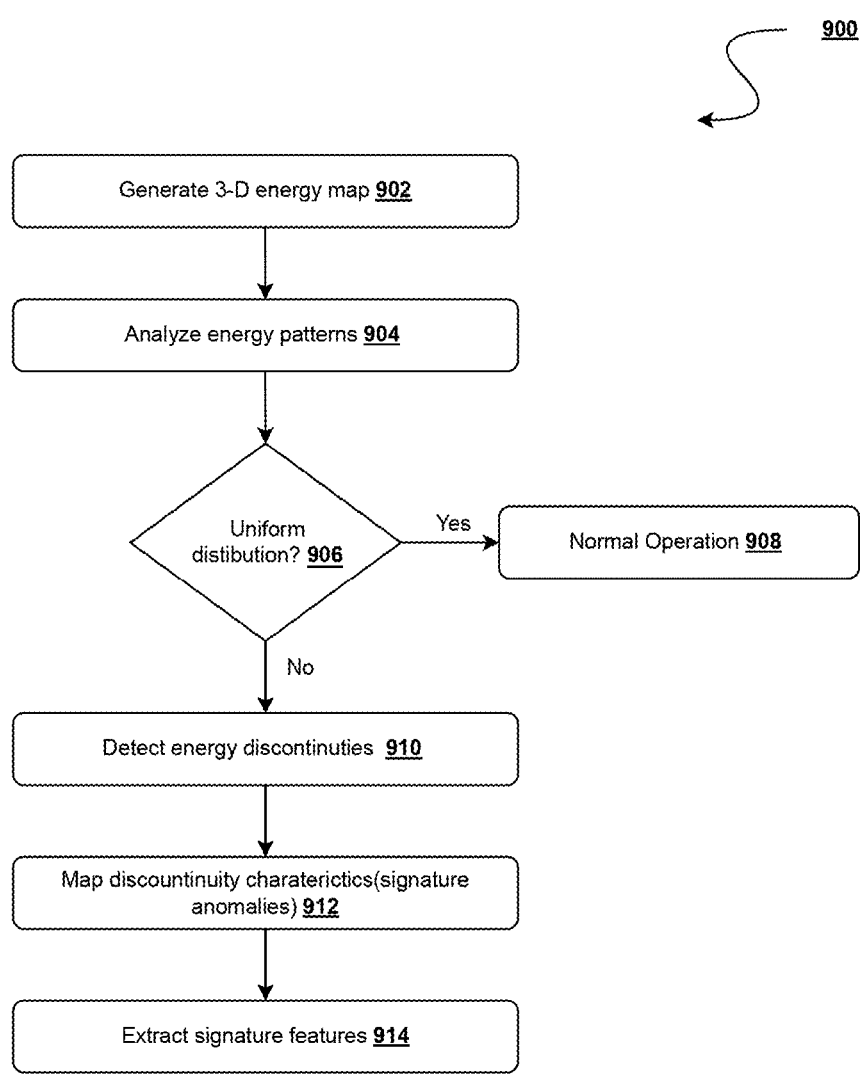
FIG. 9 is a flow diagram describing a method of energy distribution analysis to detect signature anomalies, according to another embodiment of the invention.

FIG. 9 is a flow diagram describing method 900 of energy distribution analysis to detect signature anomalies, according to another embodiment of the invention. At step 902, anomaly detection system 510 creates a 3D energy map from the time-series data. In an embodiment, orthogonal kernel basis functions provide phase (including time), amplitude, and frequency of occurrence of signature anomalies in the energy map of monitored system 530. An energy map from the time-series data represents energy distribution across frequency, time, and amplitude.

At step 904, anomaly detection system 510 analyzes how energy is distributed across different frequencies, time periods and amplitude levels.

At step 906, anomaly detection system 510 determines if the energy distribution is uniform. In a perfectly operating system embodiment, the energy profile should be uniform or flat across all dimensions, representing stable operation with constant (flat) amplitude at the fundamental frequency. Actual energy distribution may be compared to expected (uniform) distribution to identify deviations.

At step 908, monitored system 530 is under normal operation when the energy distribution is uniform.

At step 910, energy discontinuities are detected when the energy distribution is not uniform. Anomaly detection system 510 may be configured to identify variations from the fundamental frequency component in the 3D energy space. The baseline for comparison is a flat (constant amplitude) energy distribution, and any deviation from this flat distribution constitutes a signature anomaly. These energy discontinuities may be potential anomalies. They indicate a pattern deviation from expected behavior.

At step 912, energy distribution within the discontinuity is carefully mapped, identifying concentration points, spread patterns, and energy gradients. The mapping of discontinuity characteristics is a comprehensive process that begins with precise spatial mapping across time and frequency domains along with amplitude characteristics.

In the time domain, the system identifies the start point and duration of discontinuities, analyzing their temporal patterns and relationships to operating cycles. Simultaneously, frequency domain analysis determines affected frequency bands, bandwidth characteristics, and harmonic relationships, while amplitude analysis captures peak values, average changes, and distribution patterns. Boundary analysis examines edge characteristics, including transition sharpness, gradient changes, and boundary stability, providing crucial information about the nature of the discontinuity.

Physical correlation mapping ties the observed discontinuities to specific equipment characteristics. For rotating equipment, this includes analysis of harmonic patterns, rotational frequency relationships, and bearing signatures. Flow equipment analysis focuses on flow disturbance patterns, pressure fluctuation signatures, and cavitation indicators. Electrical systems are evaluated for phase relationships, power quality signatures, and loading patterns.

The system extracts and quantifies characteristic parameters across multiple dimensions. Magnitude metrics include peak values, RMS levels, and deviation measurements. Time-based metrics capture duration, repetition rates, and cycle relationships, while frequency metrics analyze spectral width, center frequency, and harmonic content. These parameters form a comprehensive profile of each discontinuity.

Pattern classification organizes discontinuities based on both shape and behavior. Shape classifications include point, linear, area, and volume discontinuities, while behavior classifications distinguish between steady-state, transient, periodic, and random patterns. This classification helps in correlating patterns with specific equipment issues and fault types.

Shape analysis forms a critical component of the mapping process. The system analyzes volume characteristics including height (amplitude dimension), width (time dimension), and depth (frequency dimension), along with symmetry properties. Energy distribution within the discontinuity is carefully mapped, identifying concentration points, spread patterns, and energy gradients.

At step 914, feature extraction from signature anomalies is performed. The extraction of signature features is a critical process that occurs after energy discontinuities are identified in the system's energy map. This process involves analyzing the specific characteristics of discontinuities to identify distinct features that compose a signature anomaly. Each signature anomaly may contain multiple feature components, characterized by their unique volume shapes and energy distributions in the three-dimensional space (time, frequency, and amplitude).

The feature extraction process begins by isolating individual components within the detected energy discontinuity. For each component, the system measures fundamental parameters including the width (temporal extent), amplitude (energy magnitude), and frequency content. These measurements establish the spatial boundaries and energy characteristics of each feature component. The system analyzes the relationships between these components, including their relative positions, energy distributions, and temporal/frequency correlations, as these relationships often provide crucial information about the underlying physical problem.

The extracted features are then quantified based on their energy volume calculations and distribution patterns. This quantification includes measuring the concentration of energy within each feature, analyzing the symmetry and shape characteristics, and determining the stability of the feature over time. These measurements are particularly important as they directly correlate to specific types of equipment issues—for example, a bearing fault might produce features with specific frequency distributions and temporal patterns, while a flow restriction might generate features with distinct amplitude characteristics and energy concentrations. This detailed feature extraction enables accurate classification of anomalies and precise correlation with physical equipment problems.

Dashboard 1000 may be available to client devices 540 belonging to primary users, plant operators, and maintenance teams. Dashboard 1000 provides real-time monitoring of equipment components, immediate notification of critical alerts, and access to current operating parameters. In some cases, detailed anomaly information, wear trends and projections, and maintenance scheduling data may be provided via dashboard 1000.

Figure 10A:
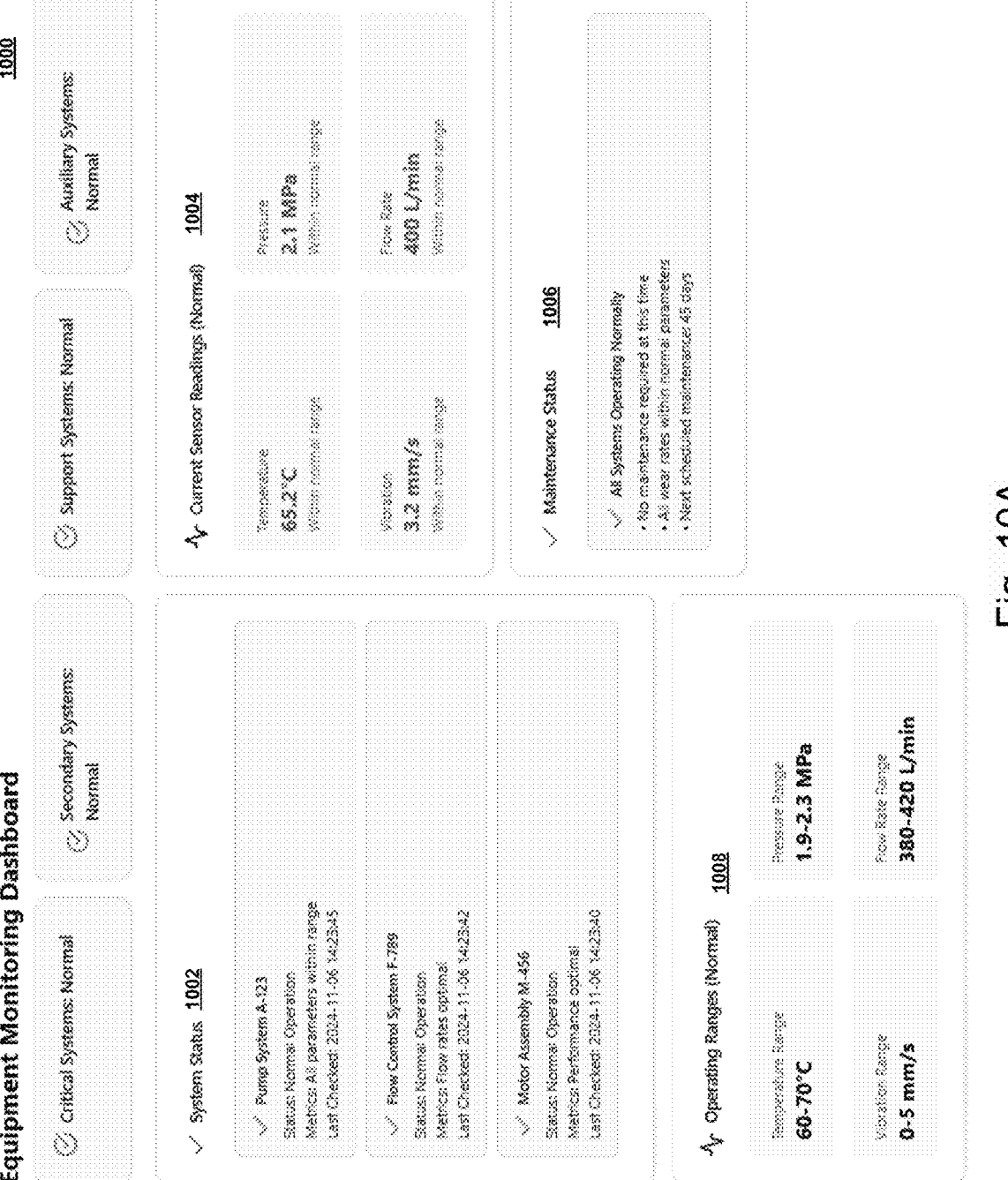
FIG. 10A shows an equipment monitoring dashboard depicting a normal operation of centrifugal pump system, according to an embodiment of the invention.

FIG. 10A shows an equipment monitoring dashboard 1000 depicting a normal operation of a centrifugal pump system, according to an embodiment of the invention. Dashboard 1000 includes information related to system status 1002, sensor readings 1004, maintenance status 1006, and operating ranges 1008. Sensor readings 1004 may refresh continuously with new measurements. Operating parameters show normal operating ranges 1008 for reference. All current values fall within expected ranges and there are no deviations or anomalies detected. System status 1002 shows that all the equipment components are operating normally.

FIG. 10B shows an equipment monitoring dashboard 1000 depicting anomalous operation of the centrifugal pump system, according to an embodiment of the invention. Dashboard 1000 is different from the one presented during normal operation and includes information related to critical alerts 1013, warning alerts 1012, sensor readings 1004, and maintenance alerts 1010. Critical alerts show that a high-frequency vibration is detected at a pump bearing and a warning alert is shown for the flow valve. Maintenance alerts provide a forecast for bearing replacement.

Dashboards 1000 shown in FIGS. 10A and 10B are examples and the items displayed may be modified as per user preferences and user roles. Further dashboard 1000 may be automatically generated by anomaly detection system 510 based on the current status of the monitored system and the user to whom the information is presented. For example, the maintenance team may be provided with detailed anomaly information, wear trends and projections, and maintenance scheduling data. In another example, real-time monitoring of equipment status, immediate notification of critical alerts, and access to current operating parameters may be provided to plant operators.

Figure 11:
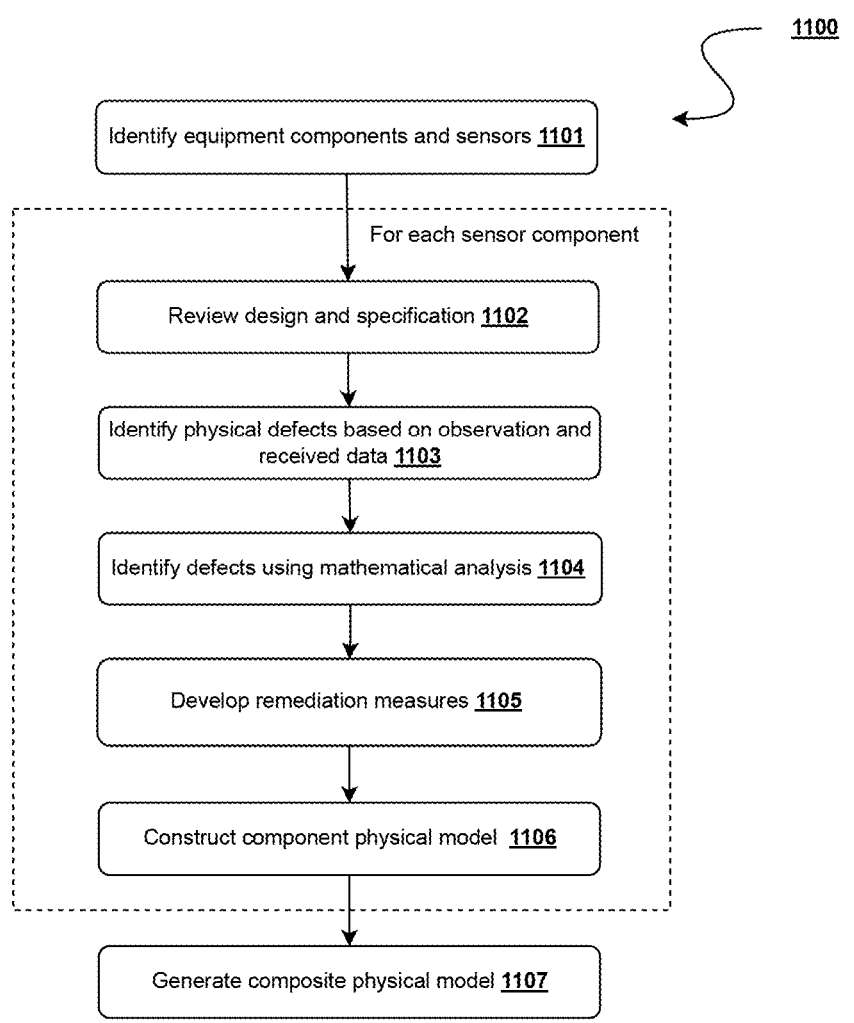
FIG. 11 is an illustration of a construction of a physical model of a sensor (component)/equipment that is part of a data collection system in a monitored system, according to an embodiment of the invention.

FIG. 11 is an illustration of a construction of a physical model of a sensor (component)/equipment that is part of a data collection system in a monitored system, according to an embodiment of the invention. According to the embodiment, in a first step 1101, identify a specific type of equipment being monitored. In a next step 1102, review in detail the manufacturer's design and specifications for selected equipment. In a next step 1103, receive data associated with a visual identification of any physical problems, for example a visual description of abnormalities which may include a mechanical defect, for example, a bur from the manufacturer's design or production techniques. In an embodiment, receive physical problem data from the database for selected piece of equipment associated with the manufacturer's design or production techniques. In a next step 1104, perform an analysis on selected equipment to identify any problems in design or production which may comprise one or more of the following: spectral analysis; acoustic analysis; infrared analysis; ultrasonic analysis; root cause failure analysis. Wherein the analysis may execute one or more methods described herein. In a next step 1105, Design remediation measures to minimize the effects of problems discovered for the purpose of building an accurate physical model reflecting these defects. In a next step 1106, Construct physical model from observed and analyzed physical problems incorporating remediation measures which may be used in a monitored system to extend the life of selected equipment. In a next step 1107, Identify each sensor (component) that is being used to monitor equipment.

In a next step 1108, for each sensor, iteratively generate a component physical model by: step 1109, reviewing the manufacturer's design and specifications; step 1110, receive data associated with a visual identification of any physical problems associated with the manufacturer's design or production techniques; step 1111, perform detailed mathematical analysis to identify any problems in design or production; step 1112, design remediation measures to minimize the effects of problems discovered for the purpose of building an accurate physical model reflecting these defects; step 1113, construct physical model from observed and analyzed physical problems incorporating remediation measures which may be used in a monitored system to extend the life of selected equipment; step 1114, combine all component physical models together to form composite physical model of the selected sensor. The iterative process may repeat the above steps for each sensor of the selected equipment.

In a next step 1115, Combine all composite physical models of equipment and sensors to form a composite physical model of the entire monitored system.

In an exemplary embodiment, an Electric Submersible Pump (ESP) powered by a Variable Frequency Drive (VFD) and a plurality of pressure sensors may comprise components in a monitored system to form the basis of an anomaly detection system. In order to build the physical model for each component, manufacturer's design and specifications are received by systems described herein. Data associated with visual data identifying any physical problems for selected component associated with the manufacturer's design and production techniques is received, the data may include, for example, a bur from the manufacturing process or a defect in materials used in constructing a sensor, for example, piezoelectric transducer. An analysis is then performed on a selected component to identify any problems in design and production, the analysis comprising at least spectral analysis, acoustic analysis, infrared analysis, ultrasonic analysis, root cause failure analysis, or the invention described in our patent. Remediation measures may then be computed to minimize the effects of the problems discovered in the manufacturing or design process for the purpose of building an accurate physical model reflecting these defects. A component physical model was constructed using the observed and analyzed physical problems of selected component incorporating the remediation measures which may be used in a monitored system to extend the life of selected equipment. The above steps may be repeated for each component of the monitored system. All component physical models together may form composite physical model of the sensor and equipment network of monitored system. The composite physical model is made up of several parameters which may include wear time and condition. Wear time may comprise manufacturing defects that may show up as time progresses with running equipment. Condition may be the state of health of the component at a given time. These parameters contribute to the overall physical model characteristics. For example, wear time contributes to one of the failure modes that develop as time progresses. The skilled person will be aware of a range of possible modifications of the various embodiments described above. Accordingly, the present invention is defined by the claims and their equivalents.

What is claimed is:

1. An anomaly detection and control system comprising at least one processor, a memory, and a plurality of programming instructions, the plurality of programming instructions when executed by the at least one processor cause the processor to:

receive uniformly spaced clean digital data from a plurality of sensors, monitoring equipment components of a monitored physical system, the plurality of sensors comprising at least vibration, flow rate, pressure, power meters, pH, torque or acoustic sensors that generate signals representative of operating conditions of the equipment components;

receive, from a database, physical model parameters derived from a composite physical model of the monitored physical system, wherein the composite physical model comprises individual component physical models of sensors and equipment components, and wherein each individual component physical model is based on manufacturer design specifications, analyzed physical defects, and associated remediation measures and further includes process parameters, operating thresholds, component status and condition, and failure modes, in order to construct an accurate physical model for each monitored equipment component; generate, by an orthogonal function processor, a set of orthogonal kernel basis functions defined by a native sample interval and gaussian distribution parameters derived from the composite physical model;

correlate the uniformly spaced clean digital data with the set of orthogonal kernel basis functions implemented by the orthogonal function processor to extract a plurality of feature components representing correlation between measured sensor data and modeled system responses, and generate a three-dimensional energy map across phase, frequency, and amplitude domains that is dynamically updated in real time for signature anomaly detection and visualization;

detect a set of signature anomalies in the three-dimensional energy map by identifying non-uniform energy distributions or discontinuities relative to a predefined spectral baseline derived from the composite physical model, each detected signature anomaly being associated with at least one monitored equipment component of the physical system; for each detected signature anomaly of the set of signature anomalies:

determine a number and corresponding width of each feature component associated with the detected signature anomaly; while the number of orthogonal kernel basis functions within the set of orthogonal kernel basis functions is less than the number of feature components indicating that the current precision of analysis is insufficient to fully characterize the detected signature anomaly:

update at least a portion of the set of orthogonal kernel basis functions, wherein the updated set of orthogonal kernel basis functions has increased precision by increasing the number of orthogonal kernel basis functions relative to the immediately preceding set of orthogonal kernel basis functions;

correlate the uniformly spaced clean digital data with the updated set of orthogonal kernel basis functions using the orthogonal function processor to extract additional feature components corresponding to newly generated basis functions, thereby adaptively increasing analysis precision of the detected signature anomaly; and determine whether the number of feature components extracted from correlation with the updated set of orthogonal kernel basis functions has converged or changed relative to the prior iteration, thereby assessing whether further refinement of the basis functions is required;

determine the width of each feature component by measuring native sample interval of each feature component within the three-dimensional energy map;

while the width of each feature component is less than a width of a corresponding orthogonal kernel basis function of the updated set of orthogonal kernel basis functions, indicating that the existing basis-function resolution is coarser than the observed signature anomaly feature and additional refinement is required:

modify the updated set of orthogonal kernel basis functions by narrowing each orthogonal-kernel-basis-function width parameter in relation to the measured widths of the feature components, thereby generating a modified set of orthogonal kernel basis functions having increased resolution that is quantitatively defined by the reduced width parameters of the updated set of orthogonal kernel basis functions;

correlate the uniformly spaced clean digital data with the modified set of orthogonal kernel basis functions using the orthogonal function processor to re-analyze the same uniformly spaced clean digital data with the modified basis-function set, thereby adaptively increasing resolution and improving localization accuracy of the detected signature anomaly; and determine the width of each feature component based on correlation results obtained using the modified set of orthogonal kernel basis functions;

determine whether the correlation results obtained using the modified set of orthogonal kernel basis functions have converged or changed relative to a prior iteration, thereby assessing whether further narrowing of the orthogonal kernel basis functions is required;

determine the width represents a refined sample rate of the corresponding signature anomaly feature within the three-dimensional energy map;

perform an adaptive dynamic-range adjustment on the generated three-dimensional energy-map, the adaptive dynamic-range adjustment being executed by a spectral display compander to produce an non-linear representation of the set of signature anomalies to fit a constraint associated with the spectral display compander and optimize visual contrast for increased detection precision and improved feature extraction characterization, store, in the memory, coefficients, parameters, and metadata defining the modified set of orthogonal kernel basis functions and the spectral display compander for subsequent anomaly detection and tracking system calibration, or physical model adjustment or computational resource optimization; and transmit, to a damage detector, data associated with the set of signature anomalies together with control parameters derived from the modified set of orthogonal kernel basis functions for initiating or adjusting at least one maintenance or process-control operation associated with the monitored physical system;

upon receiving confirmation of the process-control operation, update the composite physical model to include data representative of the corresponding set of signature anomalies.

2. The anomaly detection and control system of claim 1, wherein the damage detector comprises a plurality of programming instructions when further executed by the processor cause the processor to:

for each detected signature anomaly:

calculate an associated volume of energy spectrum;

compare the volume of energy spectrum against predefined equipment component fault thresholds associated with the monitored physical system;

upon the volume of energy spectrum exceeding a predefined equipment component fault threshold, generate and display a real-time instantaneous alert to a network-connected graphical user interface;

wherein the alert comprises, information associated with at least a portion of set of signature anomalies, the information comprising, at least, anomaly type, criticality level, and timestamp.

3. The anomaly detection and control system of claim 1, wherein the plurality of programming instructions when further executed by the processor cause the processor to:

acquire, by a data manager, time-series analog raw sensor data from the plurality of sensors coupled to the monitored physical system via data acquisition systems;

convert, by the data manager, raw sensor data to digital data continuously storing the incoming data into a central database for subsequent processing and historical access;

retrieve, by the data manager, digital data from the database, wherein the data may include recent samples and historical records, potentially exhibiting irregular sampling intervals or data compression artifacts;

standardize, by a data manager, the retrieved digital data;

estimate, by the data manager, the data compression factor of data stored in database;

detect, by a sample rate detector, the conditioned signal to determine a native sample interval and assess whether the data exhibits uniform or non-uniform sampling behavior across multiple sensor sources;

resample, by a resampler, the conditioned signal using the effective sampling interval to generate uniformly spaced clean digital data, when a non-uniform sampling is detected, ensuring compatibility with orthogonal kernel-based transformations.

4. The anomaly detection and control system of claim 1, wherein to detect a signature anomaly, the plurality of programming instructions when further executed by the processor cause the processor to:

generate the three-dimensional energy map based on the plurality of feature components extracted by correlating the uniformly spaced clean digital data with the modified set of orthogonal kernel basis functions, wherein the three-dimensional energy map represents the distribution of energy across the phase, frequency, and amplitude domains for real-time or iterative analysis of the uniformly spaced clean digital data;

detect the set of signature anomalies by analyzing deviations in the three-dimensional energy map relative to a predefined flat spectral threshold associated with the monitored physical system;

identify non-uniform energy distributions that are correlated with a fault associated with at least one monitored equipment component by comparing the detected spectral energy to a fundamental frequency signature from the composite physical model;

extract localized energy discontinuities, associated with the set of signature anomalies;

define the set of signature anomalies based on the extracted discontinuities and identify associated features components, the set of signature anomalies comprising, at least, specific sizes, volumes, shapes, amplitudes, frequencies, phases and temporal patterns.

5. The anomaly detection and control system of claim 4, wherein the plurality of programming instructions when further executed by the processor cause the processor to:

apply a signal enhancement module comprising a spectral display compander to compress broadband noise components in processed spectral data, by attenuating high-amplitude regions using non-linear transformations wherein the processed spectral data is associated with the three-dimensional energy map;

apply a signal enhancement module comprising the spectral display compander to amplify low-amplitude, feature components of diagnostic relevance using an adaptive gain function to improve anomaly visibility and detection;

adjust the dynamic range of the signature anomalies to fit the spectral display constraints and optimize visual contrast;

display the enhanced signature anomalies on a spectral display for operator interpretation and diagnostics of one or more equipment components of a monitored physical system.

6. The anomaly detection and control system of claim 1, wherein the damage detector comprises a plurality of programming instructions when further executed by the processor cause the processor to:

transform processed spectral features from the set of signature anomalies into a one-dimensional parameter representing the cumulative impact of the set of signature anomalies on condition indicators associated with the monitored physical system;

identify long-term cumulative damage patterns using a damage detector configured to track progressive anomaly effects over time associated with the monitored physical system;

analyze health degradation parameters associated with the monitored physical system, including estimated wear rates and efficiency loss indicators, based on the identified accumulated damage patterns;

evaluate the severity of the cumulative damage using the analyzed degradation parameters; and generate a list of possible actions to rectify the anomalies based on the severity;

generate and display, to a network-connected graphical user interface, a real-time alert notification, using the accumulated damage alert generator wherein the accumulated real-time alert comprises wear rates, early warning indicators, part replacement schedules, and prioritized maintenance actions based on historical anomaly progression.

7. The anomaly detection and control system of claim 1, wherein the plurality of programming instructions when further executed by the processor cause the processor to:

receive uniformly spaced clean digital data from the resampler and perform multivariate time-domain correlation analysis including one or more of autocorrelation, cross-correlation, or correlation coefficient computations, to identify relationships between anomalies across different time periods or across different monitored equipment components, sensors, and other data sets in the database;

receive spectral data from the adaptive anomaly analyzer and perform multivariate frequency-domain correlation analysis, including one or more of autocorrelation, cross-correlation, or correlation coefficient computations, to identify relationships between anomalies across different time periods or across different monitored equipment components, sensors, and other data sets in the database;

reduce the dimensionality of the temporal and spectral data based on an optimal linear transformation to enhance the separation of anomaly-related features from noise to identify one or more equipment components closest to the source of an anomaly by evaluating anomalous signal energy levels and at least one correlation metric between monitored equipment components;

process the results of the correlation and dimensionality reduction analysis using an interpreter module, wherein the interpreter module assesses, at least, the amplitude and the characteristics of correlated signature anomalies of the set of signature anomalies; and compare signature anomaly characteristics with stored reference patterns indicative of specific equipment component faults, thereby facilitating identification of potential causes or sources of the anomalies and possible corrective actions to extend the life of the equipment component of the monitored physical system.

8. The anomaly detection and control system of claim 7, wherein the plurality of programming instructions when further executed by the processor cause the processor to:

receive data from the interpreter module comprising correlated signature anomaly data, including at least one of identified signature anomalies, potential signature anomaly sources, and recommended corrective actions to rectify the anomalies;

compare time-series data against a composite physical model of the monitored physical system, and compute a divergence metric;

classify, by a classifier, the correlated signature anomaly data representative of a normal or anomalous condition by applying one or more signal processing-based classification techniques, comprising divergence measures, hypothesis testing methods, or graph processing techniques;

compute a confidence level in the classification based on a deviation from a pre-defined threshold; and transmit the confidence level to a network-connected graphical user interface.

9. The anomaly detection and control system of claim 1, wherein the orthogonal kernel basis functions comprise Gaussian distributions defined by a width, a height, and offset parameters, each multiplied by a complex exponential term that comprises a native sample interval that defines a width of an orthogonal kernel basis function or feature component, wherein the Gaussian parameters and native sample interval are derived from the composite physical model of the monitored physical system.

10. The anomaly detection system of claim 1, wherein the manufacturer design specifications include characteristics comprising at least one of: rotational speed, balance parameters, alignment specifications, fluid flow rates, mechanical pressures ranges, temperature ranges, electrical characteristics, and equipment process specifications, wherein the anomaly detection is dynamically adapted to the operational behavior of each type of monitored equipment component.

11. The anomaly detection and control system of claim 1, wherein the construction of each individual component physical model comprises analyzing underlying physics of the monitored physical system, process parameters, operating thresholds, equipment component status and condition, and failure modes; and wherein the composite physical model establishes a mapping between energy of the detected signature anomalies and conditions associated with specific equipment components, and supports the maintenance or process control operation of the monitored physical system.

12. The anomaly detection and control system of claim 1, wherein the monitored physical system comprises at least one of:

rotating equipment comprising pumps, compressors, generators, turbines, or motors;

flow equipment comprising valves, pipelines, or fittings;

electrical equipment comprising transformers, switchgear or uninterruptible power supply; and process equipment comprising heat exchangers, separators or extraction units.

13. The anomaly detection and control system of claim 1, wherein the plurality of sensors include a combination of specific sensors selected according to the monitored physical system mechanisms, the sensors comprising at least one of:

voltage sensors for measuring electrical potential differences;

current sensors for measuring current flow;

phase sensors for measuring electrical phase relationships;

flow rate sensors for measuring fluid flow;

piezoelectric transducers for measuring mechanical stress;

accelerometers for measuring vibration;

temperature sensors for measuring thermal conditions;

optical sensors for measuring position; and capacitive sensors for measuring process parameters.

\* \* \* \* \*